(12) United States Patent
Harfouche et al.

(10) Patent No.: US 11,477,410 B1
(45) Date of Patent: *Oct. 18, 2022

(54) METHOD TO CAPTURE MULTIPLE SIMULTANEOUS MICROSCOPY IMAGES FROM MULTIPLE DIGITAL SENSORS USING FIELD PROGRAMMABLE GATE ARRAYS

(71) Applicant: Ramona Optics Inc., Durham, NC (US)

(72) Inventors: Mark Harfouche, Durham, NC (US); Jaehee Park, Durham, NC (US); Colin Cooke, Durham, NC (US); Gregor Horstmeyer, Durham, NC (US); Veton Saliu, Durham, NC (US)

(73) Assignee: Ramona Optics Inc., Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/157,924

(22) Filed: Jan. 25, 2021

Related U.S. Application Data

(60) Provisional application No. 62/965,959, filed on Jan. 26, 2020.

(51) Int. Cl.
*H04N 5/77* (2006.01)
*H04N 5/247* (2006.01)
*H04N 5/232* (2006.01)
*H04N 5/91* (2006.01)
*H04N 7/18* (2006.01)

(52) U.S. Cl.
CPC ............... *H04N 5/77* (2013.01); *H04N 5/232* (2013.01); *H04N 5/247* (2013.01); *H04N 5/91* (2013.01); *H04N 7/18* (2013.01)

(58) Field of Classification Search
CPC ............ H04N 5/77; H04N 5/04; H04N 5/247; H04N 5/91; H04N 7/18
See application file for complete search history.

(56) References Cited

U.S. PATENT DOCUMENTS

| 5,526,050 A * | 6/1996 | King | H04N 7/181 348/386.1 |
| 2015/0222939 A1* | 8/2015 | Gallant | H04L 43/062 725/9 |
| 2020/0143032 A1* | 5/2020 | Horstmeyer | G02B 21/06 |
| 2021/0096870 A1* | 4/2021 | Courter | H04N 5/74 |

* cited by examiner

*Primary Examiner* — Thai Q Tran
*Assistant Examiner* — Jose M Mesa
(74) *Attorney, Agent, or Firm* — Tue Nguyen

(57) ABSTRACT

A method to capture microscopy images from multiple image sensors and to relay them to one or more central processing units while minimizing delay in image capture can include the co-optimization of image acquisition hardware, data aggregation digital logic, firmware, and integration with data post processing on the central processing units. The methods can include organizing the incoming image data into data packets containing partial image frames, together with configuring the central processing units to be capable of analyzing the received partial image frames. The quick analysis of the images, e.g., on the partial image frames, can allow the computational system to rapidly respond to the captured images, such as to provide feed back on the captured images before the next images are to be captured.

20 Claims, 32 Drawing Sheets

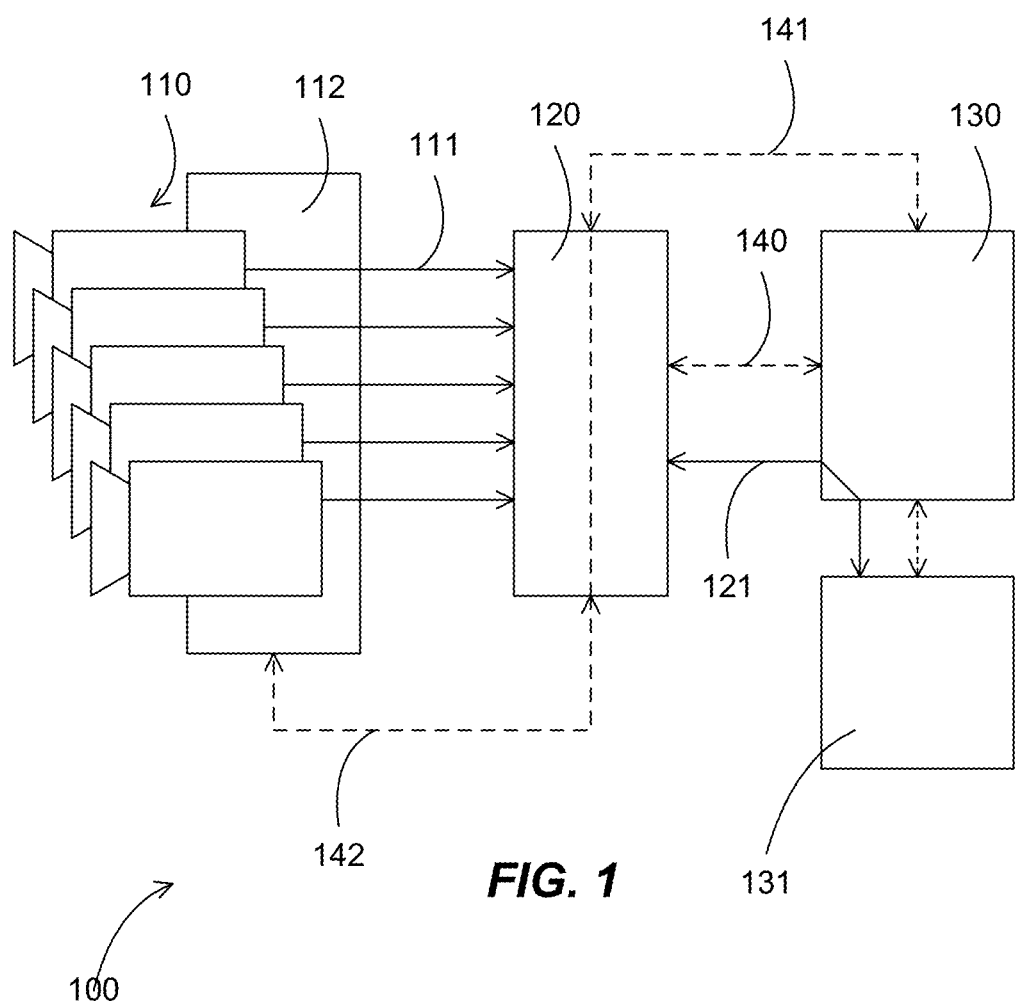

Minimizing delay in image capture in a computational multi-camera system by efficiently organizing data acquired simultaneously from multiple cameras to be sent to a computational system for analysis
200

FIG. 2A

Minimizing delay in image capture in a computational multi-camera system by receiving data acquired simultaneously from multiple cameras, followed by organizing the received data into data packets matching a memory structure of a computational system and by sequentially sending the data packets to the computational system for analysis while receiving subsequent data to be organized into data packets
220

FIG. 2B

Forming a computational multi-camera system with a process module between the multiple cameras and the computational system, wherein the process module is configured to reorganize the data captured by the multiple cameras into data packets to be sent to the computational system for analysis while still in the process of receiving subsequent data to be organized into data packets
240

FIG. 2C

Forming a process module interfacing multiple cameras and a computational system, wherein the process module is configured to reorganize image frames captured by the multiple cameras into partial image frames to be sent to the computational system for analysis while still in the process of reorganizing subsequent partial image frames
260

FIG. 2D

Sending streams of partial image frames, from a camera array, to a computational system for sequentially constructing a complete image frame from multiple composite partial image frames
800

*FIG. 8A*

Adjusting an operation parameter for next image frames when processing current image frames based on instruction from a computational system
820

*FIG. 8B*

Sending multiple streams of partial image frames to be sequentially received by a computational system, wherein the partial image frames are portions of image frames captured by cameras in a camera array
840

*FIG. 8C*

Sending multiple partial image frames to a computational system, wherein the computational system is configured to constructing a composite image frame from the multiple partial image frames
860

Receiving an instruction from the computation system regarding operating parameters
870

*FIG. 8D*

Responding to a camera array based on partial image frames received from cameras in the camera array
900

FIG. 9A

Instructing a camera array regarding capture operation on next image frames before the camera array finishes processing current image frames
920

FIG. 9B

Receiving, by a computational system, multiple partial image frames captured by cameras in a camera array
940

↓

Sending an instruction relating to operation of the camera array based on a processing of the multiple partial image frames
950

FIG. 9C

Receiving, by a computational system, sequences of multiple partial image frames, wherein each sequence comprises partial image frames of image frames captured by cameras in a camera array
970

↓

Constructing sequences of a composite partial image frame from the sequences of partial image frames, wherein a composite partial image frame is constructed from multiple partial image frames
980

FIG. 9D

Coupling a process module to multiple cameras in a camera array, wherein the process module is configured to receive multiple streams of partial image frames from the cameras
1100

Configuring the processing module for sequentially transmitting the multiple partial image frames to memory of a computational system, wherein the multiple partial image frames are transmitted in a round robin algorithm from the multiple streams with the time slot being the partial image frame
1110

FIG. 11A

Coupling a process module to multiple cameras in a camera array, wherein the process module is configured to receive multiple streams from the cameras, wherein the process module is configured to form sequences of partial image frames from each stream, wherein corresponding partial image frames in subsequent sequences form a full image frame capture by a camera
1130

Configuring the process module for sequentially transmitting the partial image frames in a round robin algorithm with a time slot allocated for a stream being the time to send a partial image frame
1140

Configuring the process module for sending the sequentially transmitted partial image frames to memory locations of a computational system, wherein the memory locations are configured to form contiguous memory location for the full image frames
1150

FIG. 11B

```
┌─────────────────────────────────────────────┐
│ Continuously receiving in parallel multiple │
│ streams with data in each stream comprising │
│ image frames captured from a camera,        │
│ wherein each stream comprises a sequence of │
│ rows of data of the image frames            │
│                  2000                       │
└─────────────────────────────────────────────┘
                      ↓
┌─────────────────────────────────────────────┐
│ After receiving one or more rows of data    │
│ from a parallel stream, forming a data      │
│ packet comprising the one or more rows of   │
│ data, wherein the data packet further       │
│ comprises information related to a          │
│ destination for the data packet             │
│                  2010                       │
└─────────────────────────────────────────────┘
                      ↓
┌─────────────────────────────────────────────┐
│ Sequentially sending the data packets from  │
│ the multiple parallel streams to the        │
│ destinations of the data packets in a round │
│ robin scheduling of the data packets in     │
│ which a data packet of each stream takes    │
│ turn to be sent                             │
│                  2020                       │
└─────────────────────────────────────────────┘
```

FIG. 20A

```
┌─────────────────────────────────────────────┐
│ Configuring a process module to receiving   │
│ in parallel multiple image frame streams,   │
│ wherein each stream comprises a sequence of │
│ rows of data of the image frames            │
│                  2040                       │
└─────────────────────────────────────────────┘
                      ↓
┌─────────────────────────────────────────────┐
│ Configuring the process module so that      │
│ after receiving one or more rows of data    │
│ from a parallel stream, wherein the process │
│ module forms a data packet comprising the   │
│ one or more rows of data together           │
│ information related to a destination for    │
│ the data packet                             │
│                  2050                       │
└─────────────────────────────────────────────┘
                      ↓
┌─────────────────────────────────────────────┐
│ Configuring the process module for          │
│ sequentially sending the data packets from  │
│ the multiple parallel streams to the        │
│ destinations of the data packets in a round │
│ robin scheduling in which a data packet of  │
│ each of the multiple parallel streams are   │
│ sent in turn                                │
│                  2060                       │
└─────────────────────────────────────────────┘
```

FIG. 20B

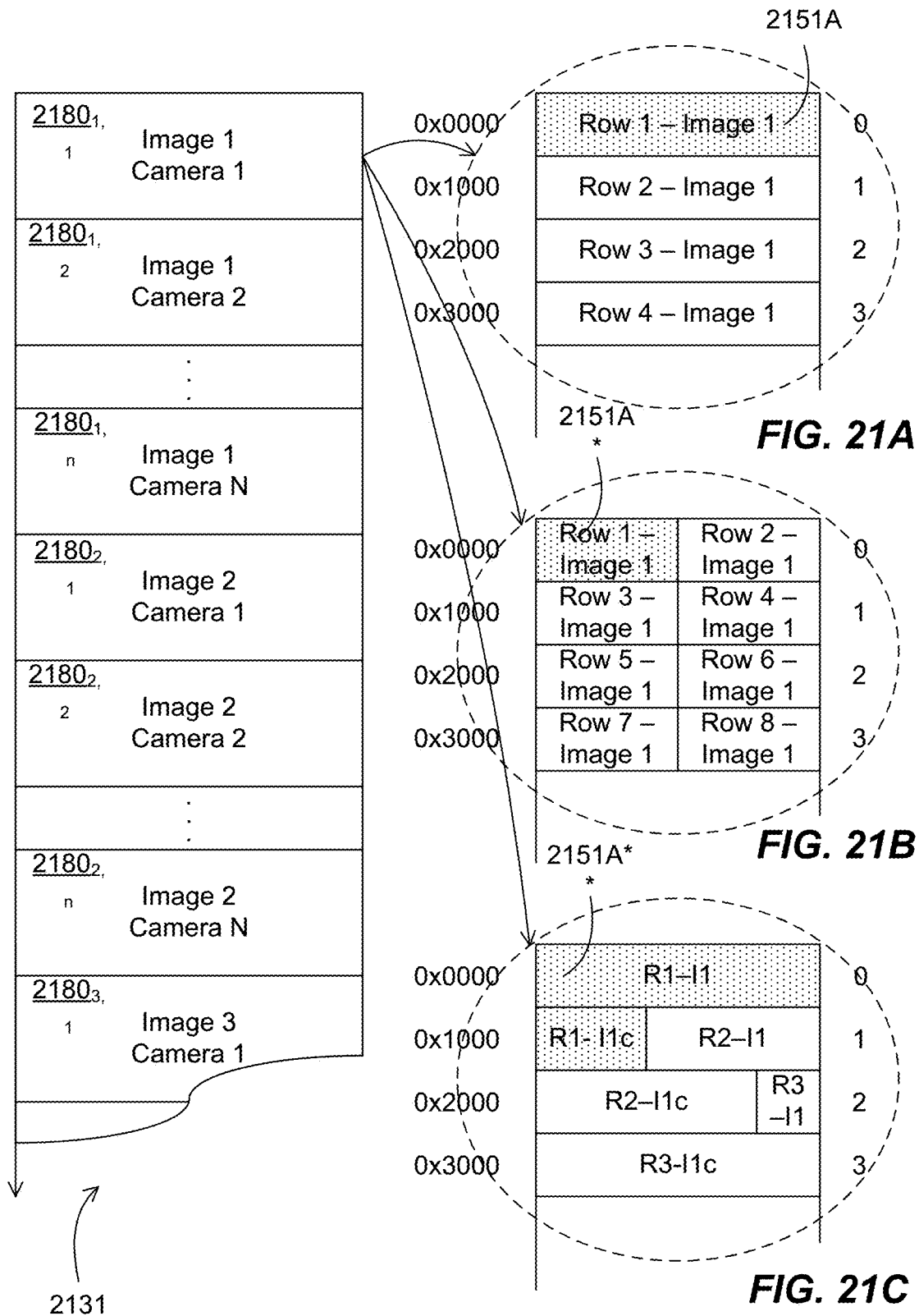

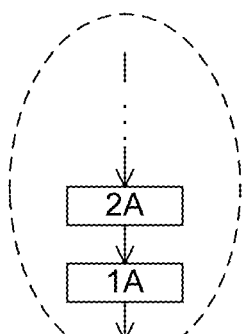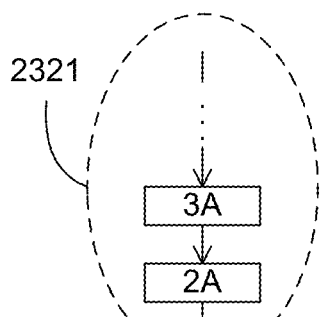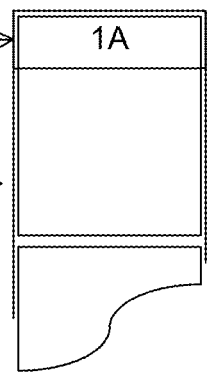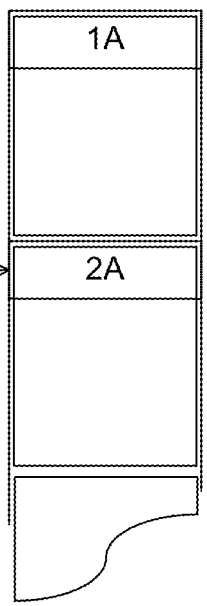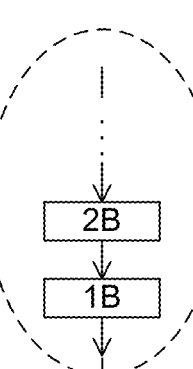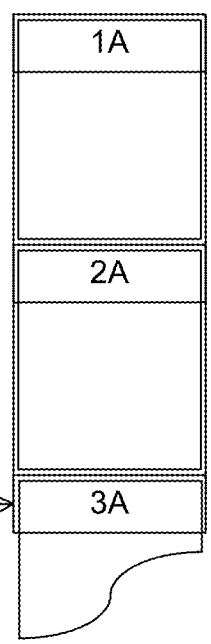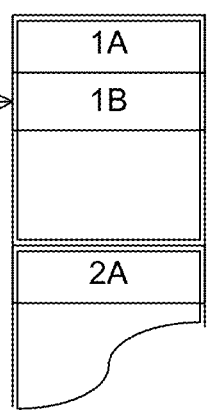
FIG. 23A
FIG. 23B
FIG. 23C
FIG. 23D Writing a data packet to a memory location, wherein the memory location is obtained from the data packet
2400

FIG. 24A

Obtaining a memory location for each data packet in a serial data packet stream
2410

↓

Directly writing the data packet to the memory location
2420

FIG. 24B

Configuring a process module to extract a memory location of a computational system from a data packet
2440

↓

Configuring the process module to write the data packet to the memory location
2450

FIG. 24C

Configuring a process module to obtain data packets from a stream of data packets, wherein each data packet comprises image data for a page of memory of a computational system
2470

↓

Configuring a process module to directly write each data packet to a memory location of a computational system, wherein the memory location is obtained through the data packet
2480

FIG. 24D

Constructing a composite partial image frame from multiple partial image frames, wherein each partial image frame are obtained from a memory area in which a complete image frame for the partial image frame is configured to be stored
2600

FIG. 26A

Obtaining multiple partial image frames from different non-contiguous memory areas, wherein one or more partial image frames are obtained from each memory area, wherein a complete image frame is stored in each contiguous memory area
2620

↓

Constructing a composite image frame from the multiple partial image frames
2630

FIG. 26B

Configuring a computational system to obtain multiple partial image frames to construct a composite image frame, wherein the multiple partial image frames are stored in different non-contiguous memory areas, wherein one or more partial image frames are obtained from each contiguous memory area, wherein a complete image frame is stored in the contiguous memory area
2650

FIG. 26C

Forming a computational multi-camera system, wherein the computational multi-camera system comprises a single clock source for the multiple cameras, a process module with direct memory access to memory of the computational module, and a speed matching of links between the multiple cameras and the process module and a link between the process module and the memory
2800

*FIG. 28A*

Forming a computational multi-camera system, wherein the computational multi-camera system comprises a process module configured to continuously sending data packets to memory of the computational module while being receiving data from the multiple cameras,
wherein each camera is configured to continuously send data to the process module,
wherein the data comprises sequential lines of image frames captured by each camera,
wherein the data packets comprise a group of the lines configured to match a page of the memory,
wherein the process module is configured to send the data packets directly to the memory without using a processor of the computational system
2820

*FIG. 28B*

Forming a computational multi-camera system with a process module between the multiple cameras and the computational system, wherein the computational system is configured to instruct the multiple cameras for parameters for next image frames based on a composite partial image frame constructed from received partial image frames
2840

*FIG. 28C*

Generating a serial data stream to a memory of a computational system, wherein the serial data stream comprises round robin partial image frames of image frames from cameras in a camera array, wherein the partial image frames are received as parallel data streams from the cameras,
wherein the bandwidth of the serial data stream is equal or greater the sum of the bandwidths of the parallel data streams through hardware connections,
wherein the serial data stream is written directly to the memory without through a processor of the computational system to match the throughput of the serial data stream
2900

*FIG. 29A*

Continuously receiving in parallel multiple streams, wherein each stream comprises sequences of portions of image frames captured from a camera of multiple cameras, wherein the multiple cameras share a common clock to reduce timing variations of the received portions
2920

Waiting for receiving enough portions from the multiple parallel streams to form a data packet for each stream, wherein the data packet matches in size with a page of memory of a computational system
2930

Sequentially sending the data packets formed from the multiple parallel streams to the memory using direct memory access to improve throughput
2940

*FIG. 29B*

Providing the process module with direct memory access to the memory
3100

Sending data to a process module, wherein the data comprises parameters to be sent to multiple cameras, wherein the cameras are configured to be operated with a common clock to reduce timing variations between multiple parallel data streams containing captured image frames by the multiple cameras when received by the process module, wherein each parallel data stream comprises sequences of lines of the image frames captured by a camera, wherein the data comprises locations of memory configured to store image frames captured by the cameras
3110

Analyzing data in the memory after the memory contains one or more data portion of an image frame from each camera of the multiple cameras,
wherein the one or more data portion comprises one or more lines or a fraction of a line of the image frame,
wherein the one or more data portion has a size of a page of the memory,
wherein the one or more data portion is reorganized by the process module after receiving data from a parallel data stream equal or more than the page of memory,
wherein the one or more data portion is sent by the process module to the memory at a memory location of the memory locations received by the process module,
wherein the one or more data portion is sent by direct memory access,
wherein the process module is configured to have matched bandwidths between the multiple parallel data streams and a serial stream comprising the one or more data portions and subsequent one or more data portions of the image frames of the multiple cameras
3120

*FIG. 31*

METHOD TO CAPTURE MULTIPLE SIMULTANEOUS MICROSCOPY IMAGES FROM MULTIPLE DIGITAL SENSORS USING FIELD PROGRAMMABLE GATE ARRAYS

The present patent application claims priority from U.S. Provisional Patent Applicant Ser. No. 62/965,959, filed on Jan. 26, 2020, entitled "A method to capture multiple simultaneous microscopy images from multiple digital sensors using field programmable gate arrays", of the same inventors, hereby incorporated by reference in its entirety.

This invention was made with Government support under R44OD024879 awarded by the NIH. The Government has certain rights in the invention.

BACKGROUND OF THE INVENTION

Capturing microscope images that offer high resolution over a large area (i.e., that contain a large number of pixels per image) is a fundamental task for many applications involving biomedical research, semiconductor manufacturing, drug discovery and manufacturing quality control. Many of these applications can benefit from the use of multiple cameras to either capture more data in parallel, or increase the captured field of view, thus enabling the user or subsequent computer software to make better decisions based on measurable optical radiation from a digital sensor. Compared to other techniques used to capture optical radiation such as optical film, digitized images enable rapid analysis by a computer and can lead to live decision making. However, many multi-sensor architectures have thus far focused on "remote operation" applications, where the image sensor and central processing unit (CPU) are separated by a slow (<1 GB/sec) data transfer connection, necessitating the need for large buffers that delay delivery of useful information to the user.

Prior work has considered how to coordinate the acquisition of multiple sensors to generate large composite videos, but the strategy employed either requires hardware to generate a single large video stream for analysis by a computer, or the CPU to deinterleave the received data before beginning post-processing. While the first strategy produces an image understandable for a human, the added feature comes at the cost of additional complexity, computation resources, and delay. The second strategy requires the receiver to carefully deinterleave the captured image data by analyzing the associated metadata per image before looking at the raw images. As many computation algorithms are optimized for information stored contiguously in memory, interleaving data at the CPU can be a costly operation for most of the commonly found CPU architectures.

Finally, other systems used to capture images outside of the microscope domain, for example of natural scenes at large distances, consider a distributed approach, wherein each image sensor is connected to an independent CPU. While these methods are adequate in capturing slowly moving samples that are under quasi-static illumination, they require additional synchronization. In the context of microscopy, where either the sample may be quickly moving or the illumination may be changing multiple times in a single second, this synchronization step across independent CPUs can be challenging and problematic. Dynamic control over the image acquisition parameters (e.g., illumination, sample position, focus) can lead to increased image quality in the context of microscopy, making synchronization between the illumination and data capture critical to the operation of the instrument.

Microscopy represents a unique imaging domain where image acquisition is often combined with robotics, and additional automated equipment that enables a variety of actions to be taken based on the measurements made by the microscopes. As such, it is important that a system be designed so as to minimize any delays in delivering the information to the end user, be it a human operator or another computer. Finally, the large volumes of data generated by multi-sensor systems represent additional challenges that necessitate the combined design of hardware and software for adequate operation.

SUMMARY OF THE EMBODIMENTS

In some embodiments, the present invention discloses methods and systems to capture microscopy images from multiple image sensors and relay them to one or more central processing units while minimizing delay in image capture. The method involves the co-optimization of image acquisition hardware, data aggregation digital logic, firmware, and integration with data post processing on the CPU. This enables rapid acquisition of microscopy images, and enhanced and simplified control over image acquisition strategies when combining the microscope with other hardware for sample handling and manipulation.

In some embodiments, the methods can include organizing the incoming image data into data packets containing partial image frames, which can be a small fraction, such as less than 1%, 0.5%, 0.2%, 0.1%, 0.05%, 0.02%, or 0.01% of a full image frame. In addition, the computational system is configured to be capable of analyzing the received partial image frames. The organization of the incoming data into partial image frames can enable fast data transfer, e.g., the partial image frames can be transferred thousands of times faster as compared to full image frames. With the fast data transfer, the computational system can also start analyzing the image data earlier, e.g., upon receiving the first partial image frames instead of waiting for full image frames. The quick analysis of the images, e.g., on the partial image frames, can allow the computational system to rapidly respond to the captured images, such as to provide feedback on the captured images before the next images are to be captured.

In some embodiments, the small size of the data packets, which can be a small fraction of a full image frame, can simplify the acquisition hardware, such as significantly reducing the requirements for data buffers between the image sensors to the computational system.

BRIEF DESCRIPTION OF THE DRAWINGS

FIG. 1 illustrates a schematic of a microscope system having the disclosed data transfer process according to some embodiments.

FIGS. 2A-2D illustrate flow charts for minimizing delays in a data transfer process according to some embodiments.

FIGS. 8A-8D illustrate flow charts for a processing module to form a data transfer process according to some embodiments.

FIGS. 9A-9D illustrate flow charts for a processor to respond in a data transfer process according to some embodiments.

FIGS. 11A-11B illustrate flow charts for forming a processing module configured for the disclosed data flow according to some embodiments.

FIGS. 20A-20B illustrate flow charts for operating a processing module configured for the disclosed data flow according to some embodiments.

FIG. 21A-21C illustrate a memory configuration according to some embodiments.

FIGS. 23A-23D illustrate a data flow for storing data packets to a memory according to some embodiments.

FIGS. 24A-24D illustrate flow charts for writing to memory according to some embodiments.

FIGS. 26A-26C illustrate flow charts for constructing partial representation of sample images according to some embodiments.

FIGS. 28A-28C illustrate flow charts for forming microscope systems according to some embodiments.

FIGS. 29A-29B illustrate flow charts for operating a microscope system according to some embodiments.

FIG. 31 illustrates a flow chart for operating a microscope system according to some embodiments.

DETAILED DESCRIPTION OF THE EMBODIMENTS

Figure 3:
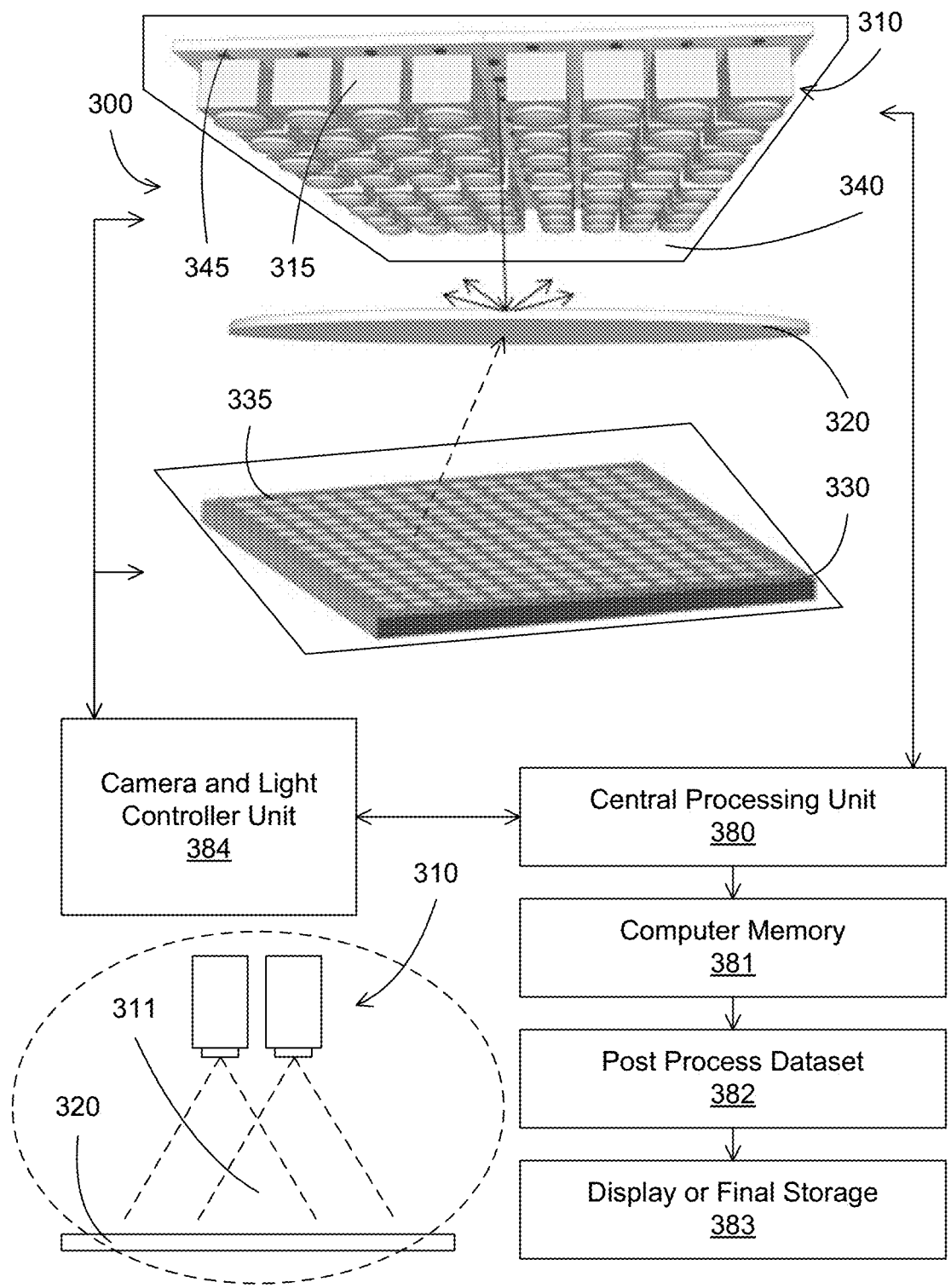
FIG. 3 illustrates a schematic MCAM system according to some embodiments.

In some embodiments, the present invention discloses methods to capture microscopy images from multiple image sensors and transfer them to a central processing unit with minimum delay in the image transfer. The method involves the co-optimization of image acquisition hardware, data aggregation digital logic, firmware, and integration with data post processing on the central processing unit. The method can allow rapid acquisition of microscopy images, especially in handling the large volume of data generated by the multi-sensor systems, which requires the combined design and optimization of hardware and software for adequate operation. The method can also provide enhanced and simplified control over image acquisition strategies when combining the microscope with other hardware for sample handling and manipulation.

A benefit of the present method is the ability to rapidly record high-resolution microscopy imagery over a very large field of view using a multitude of micro-cameras while minimizing the memory requirements on the data gathering processing module. This capability can open up new directions for scientific discovery—allowing for image snapshots or videos of large area that may contain a variety of samples including but not exclusive to freely moving organisms over more than just several square centimeters while simultaneously changing their stimuli or imaging environment. It also provides a more efficient manner to obtain large data volumes from large, flat objects (e.g., semiconductor wafers, sheets of glass, plastic components) while their imaging environment is adapted to the recorded images or partial images.

Data Transfer Architecture

In some embodiments, the present invention discloses a data transfer process with focus on minimizing delays, for example, in acquiring raw image data from the time an operator defines the dynamic settings of a multi-sensor array microscope to the time a processor represents the acquired images to the operator. The data transfer process can be used in a system such as a multi-sensor array microscope, which can be designed to minimize any delays, for example, through an optimization of component hardware and data flow management, in delivering the acquired information to the end user, such as a human operator or an automated equipment to enable responses based on the microscope measurements. The minimum delays can allow fast responses for fast changing environment, such as in robotic configurations In some embodiments, delays can be reduced by having accurate timing between the multiple data sources through a single clock to achieve a minimum variability in the data streams from the data sources. For example, the data acquisition from multiple camera units in a camera array of a computational microscope system can have clock buffers running from a single clock generator, together with same settings of for the multiple camera units to achieve a minimum variability in the data streams sent from the camera array.

Further, the microscopy image data simultaneously acquired from multiple camera units can be carefully organized to be efficient in sending and storing in memory of a computational system, such as a standard computer. The memory can be fast memory for fast access from the computational system, such as RAM (random access memory) or SSD (solid state drive). Other types of memory can also be used. For example, the image data can be arranged in small data packets, which can be sent through small buffer areas directly to the memory of the computational system. A processing module, such as a field programmable gate arrays (FPGA), can enable low latency small packet data shuffling and preparation, in the data transfer process between the multiple camera units and the computational system. With the FPGA gathering only the small data packets from the multiple data streams received from the multiple camera units before sending to the computational system for analysis, this can avoid storing large data on the FPGA, together with the ability to enabling rapid analysis on the computational system while the data is being transmitted. The small data packet arrangement can provide a time efficient data handling process, especially for parallel data handling from multiple sensors simultaneously.

In some embodiments, delays can be reduced by eliminating or reducing potential data bottleneck caused by merging data from multiple parallel image streams into a serial data packet stream. For example, by matching the bandwidth of the serial data stream link with the combined bandwidths of all parallel image streams, the serial data link can successfully accommodate all the incoming data traffic from the multiple parallel image streams received from the multiple camera units.

In some embodiments, the serial data link can be configured with multiple lanes, with each lane capable of data transmission of a predetermined bandwidth. The multi-lane serial data link can be selected to match the bandwidths of the incoming data streams. For example, in a microscope system having 54 camera units communicating over 2 data lanes operating at 1 GHz, a parallel data stream can have a bandwidth of 2 Gbits of data per second, for a total of 108 Gbits/second for the combined parallel data streams. To reduce potential delays, a high speed serial interface with higher than 108 Gbits/sec bandwidth needs to be selected. For example, using a PCIe (Peripheral Component Interconnect Express) interface, which can offer 8 Gbits/sec data transfer rate, a 16-lane PCIe interface can be used to accommodate the parallel data streams, since the output bandwidth of the 16-lane PCIe interface is 128 Gbits/sec, which is larger than the input bandwidth of 108 Gbits/sec.

Further, the data flow can be integrated between the data acquisition and the data processing system, e.g., the computational system, to minimize further transfer delay. For example, the processing module responsible for sending the serial data stream to the data processing system can be integrated so that the data packets can be sent directly to the memory of the processing system, e.g., without contribution from the processing system, or not overhead for the processor of the processing system. Direct memory transfer can be accomplished by using direct memory access (DMA) feature on the processing system, which can allow the processing module to access main system memory independent of the central processing unit (CPU) of the processing system.

In some embodiments, the CPU can provide addresses, or links to the addresses, of the memory where the incoming serial data stream to be stored. The memory addresses can be used in direct memory access so that the data packets originating from different camera units arrive at their respective locations in CPU memory. For optimal computation speed, the addresses can include a series of addresses that contain the starting locations of the buffers for storing all images captured by all camera units, with each buffer large enough to store an image. In addition, to ensure efficient direct memory access, the addresses are optimized to the operating system boundaries, such as in integer multiples of 4096 bytes. Further, the size of the data packets can be chosen to match the physical structure of the memory, such as equal to 1 page of memory, e.g., 4096 bytes, for efficient data transfer.

In some embodiments, the present invention discloses a data transfer process with the data from multiple incoming data streams organized to form suitable data packets to send directly to a memory storage. The data packets can be large enough so that a processor can obtain meaningful information with just one or a few of data packets. The data packets can be small enough to allow quick responses from the processor, such as changing data acquisition parameters before the complete data is sent or received. Thus, the data packet can be a partial image frame size, such as a portion of an image captured by a camera unit. Further, the data packets can be selected based on the memory structure, such as one or more pages of the memory. For example, the data packet can be one or more lines of an image, including partial lines, which can fit into a page of the receiving memory.

In some embodiments, the computational system can be configured to analyze or process after receiving as little as a data packet in the memory, or a data packet from each camera units. For example, a processing module can transfer, in sequence, data packets from multiple camera units using a round robin algorithm, e.g., a first data packet for a first image captured from a first camera unit is sent first, followed by first data packet from a second camera unit, until the first data packet from the last camera unit. The sequence is then repeated for the second data packets, in the same sequence of sending the second data packet from the first camera unit to the second data packet from the last camera unit. After sending the last data packets for the first image from the camera units, the sequence is then repeated for the subsequent images, to form a serial data packet stream.

For example, in a system having 5 camera units, a processing module can receive 5 data streams from the 5 camera units, and can organize the received data into 5 data packets, with each data packet including image data from a data stream. For example, the processing module can accept data from the 5 data streams into 5 buffer areas. When the buffer areas reach a threshold value, or the buffer areas are full, the processing module can organize the data in the buffer areas into data packets. The data packets can be sent out, and the buffer areas are ready to receive new data. The process can continue to generate a stream of data packets.

In some embodiments, the round robin algorithm can provide that the processing module has a sequential order for the data streams to send the data packets. For example, a sequential order can be first camera unit, second camera unit, third camera unit, fourth camera unit, and fifth camera unit. The first, second, third, fourth, and fifth camera units can output first, second, third, fourth, and fifth data streams, respectively.

Thus, the stream of data packets can include a sequence of a first data packet of the first data stream, followed by a first data packet of the second data stream, followed by a first data packet of the third data stream, followed by a first data packet of the fourth data stream, followed by a first data packet of the fifth data stream, then followed by a second data packet of the first data stream, followed by a second data packet of the second data stream, etc. In other words, a round robin order can be camera 1, camera 2, camera 3, camera 4, camera 5, camera 1, camera 2, etc.

In some embodiments, the processing module can send the data packets in a cyclic scheduling, which can be a modified round robin algorithm, which is similar in a round robin scheduling in all aspects except for the same fixed order of data streams in which the data packets are selected. For example, in a round robin scheduling, the order of the data packets are always the same, such as (1, 2, 3, . . . , n), (1, 2, 3, . . . , n), . . . , meaning a data packet is selected from a first data stream until the last data stream, followed by another data packet from the first data stream again, in exactly the same order.

In a cyclic scheduling or a modified round robin scheduling, the orders of data streams can be different. The stream of data packets can include data packets from the multiple parallel data streams arranged in a cyclic scheduling in which each data stream contributes a data packet to the stream of data packets. In the cyclic scheduling, there is a cyclic stream, or a sequence, of groups of data packets, but in each group of data packets, there is one data packet from each data stream, but not necessarily in the same order for all groups. For example, the stream of data packets can include multiple sequences with each sequence being the sequence of data packets in a same or different group of data packets. Each data packet in a group is selected from a different parallel data stream of the multiple parallel data streams. Or each group of data packets can include a data packet from each of the multiple parallel data streams.

For example, in the case of 3 camera units forming 3 parallel data streams, a first group of data packets can include a data packet from data stream 1, followed by a data packet from data stream 2, followed by a data packet from data stream 3, to form a first group of data packets with order 1, 2, 3. This first group of data packet can form a sequence of 1, 2, 3. A second group of data packets can include a group of data packets with order 1, 3, 2. This second group of data packet can form a sequence of 1, 3, 2. A third group of data packets can include a group of data packets with order 3, 2, 1. This third group of data packet can form a sequence of 3, 2, 1. There can be other sequences, such as 3, 1, 2 or 2, 1, 3.

The data packet stream can include multiple sequences, such as a first sequence of the first group, followed by a sequence of the second group, etc. The modified round robin algorithm is similar to the round robin algorithm, except for the orders of selection of the data packets from the multiple parallel data streams. In the round robin algorithm, the order is the same, such as (1, 2, 3), (1, 2, 3), (1, 2, 3), . . . for 3 data streams. In the modified round robin algorithm, the order can be the same or can be different, such as (1, 2, 3), (3, 2, 1), (1, 2, 3), (2, 1, 3) . . . for 3 data streams.

In some embodiments, the formation of a data packet stream can use the round robin scheme or the modified round robin scheme, such as cyclic scheme in which each data stream contributes a data packet to the stream of data packet. This cyclic scheme can ensure that all the data from the multiple data streams is sent to the computer memory successfully without any loss of information, and at a same time minimizing the cost of "temporary" memory and ensuring temporal consistency in the data.

For example, without the packetization of the image data, the system will stream at the data rate of a single image sensor, e.g., the slowest image sensor. For example, if an image sensor, such as image sensor 2, has an issue, such as timing issue, causing it to take twice as long to send an image, the time for the processing module to receive all images from all image sensors would be the long transfer time of the image sensor 2. With packetizing, e.g., with the image data organized into data packets sent in a cyclic scheme, the system can respond at the speed of (the number of sensors times the speed of a single sensor).

Further, a cyclic scheduling scheme for the packetization process, e.g., the formation of data packets from multiple data streams using the cyclic scheduling scheme such as the round robin scheme or the modified round robin scheme, can provide equal priority to the data streams to send data packets, such as after a camera has had a chance to send a data packet (e.g., a portion of the image frame), it "yields" to the next camera, ensuring that all cameras get a fair share at sending their information.

The equalization of fair share in sending information can provide that no camera has absolutely higher priority than other cameras, meaning that after a camera sends a data packet, the priority of that camera is lower than some other cameras, in order to prevent a camera from hogging the data transfer flow. In a round robin scheduling, after a camera sends a data packet, the priority of that camera is lower than all other cameras, e.g., that camera will not send another data packet until all other cameras have sent their data packets. The round robin scheduling provide a fixed order, such as (1, 2, 3), (1, 2, 3), (1, 2, 3), . . . for 3 cameras.

In a cyclic scheduling scheme, such as a modified round robin scheduling, the priorities of the cameras can be randomized after all cameras have sent their data packets, instead of following the same order as before as in the round robin scheduling. For example, for 3 cameras, the cameras can send data packets in an order, such as (1, 2, 3). After all 3 cameras have sent their data packets, the priorities are be shuffled, so that camera 1, which would be next in line for sending a data packet, can have different order. The order can be shuffled, such as to become (2, 1, 3). After all 3 cameras have sent their data packets, the order can be shuffled again, for example, to become (2, 1, 3). Thus, the stream of data packets would be (1, 2, 3), (2, 1, 3), (2, 1, 3), . . . .

In some embodiments, information can be added to the data packets, e.g., to the portion of mage frames that the processing module has organized into the data packets, to indicate the camera number and the data packet number. The information can be added to the front or to the end of every data packet, for example. The camera and packet information can assist in implementing the round robin or modified round robin scheduling.

For example, cameras 2 and 3 can send data to the processing module, e.g., an FPGA based module, to be each organized into data packets A B C D. The processing module can be configured so that data packets from a camera always arrive in the correct order. For example, data packet 3C from camera 3 always arrives after packets 3A and 3B and before 3D. However, the processing module will need to be configured to consider the relationship between data packets of camera 3 with data packets of other cameras, because in general, the relationship between data packet 3C and any data packets from camera 2, e.g., 2A, 2B, 2C, or 2D, is undefined.

A round robin scheduling, or a modified round robin scheduling, will help ensure that data packets are received in the approximate order of 2A, 3A, 2B, 3B, 2C, 3C, 2D, 3D. However, it is possible that due to tiny transmission delays, such as due to the nature of the asynchronous clocks in the system, the data packets are received n a different order, such as 3A, 2A, 2B, 3B, 3C, 3D, 2C, 2D. The camera and packet information in each data packets can assist in correcting the transmission delays to maintain a desired order, such as the round robin order of 2A, 3A, 2B, 3B, 2C, 3C, 2D, 3D.

The round robin scheduling or the modified round robin scheduling can avoid potential data loss as compared to a fixed priority scheduling, which assigns a high priority to one or more cameras. With fixed priority scheduling, the inherent randomness in the system may cause a camera, such as the last camera in the camera array, to slowly get delayed in sending data and eventually some data can be lost.

For example, if a fixed priority scheduling dictates that camera 1 has highest priority, it would mean that whenever a packet from camera 1 arrives, even if there is a packet ready from another camera such as camera 54, the packet from camera 1 would be sent first because it would have higher priority than a packet from camera 54. Due to the randomness, e.g., random variations, in how images are acquired, if this fixed priority scheduling is implemented, it can, under certain circumstances, lead to camera 54 never getting a chance to send its data, resulting in a data loss.

In some embodiments, fixed priority scheduling can still make use of packetizing, but ultimately, it means that camera 54 (or other camera, such as camera 8) may never have a turn at sending information because cameras 1 through 7 are always given higher priority. For example, in a fixed priority scheduling with packetization, cameras 2 and 3 can send data to the processing module, e.g., an FPGA based module, to be each organized into data packets A B C D. Fixed priority scheduling, in which camera 2 has higher priority than camera 3, may cause an issue where data packets are received, for example, 2A 2B 2C 3A 3B 3C 2D 3D. Since camera 2 having high priority, camera 2 can force camera 3 to wait for the 3 data packets 2A 2B 2C of camera 2 are ready and sent, before camera 3 has the chance to send its data packets 3A 3B 3C.

This wait, causes the FPGA based module to have to store more memory, adding to the cost of storing temporary data on the FPGA based module. It also introduces delays in the ability to process the first packet 3A from camera 3.

The CPU of the computational system can start processing the data in memory as soon as it arrives. For example, after receiving one data packet, the CPU can process it to obtain an analysis of a first portion of a first image captured by a first camera unit. After receiving one first sequence of data packets, e.g., the first portions of the first images each captured by a camera unit, the CPU can process it to obtain an analysis of first portions of all first images captured by the camera units, such as stitching the first portions together with form a first portion of an assembled image.

The disclosed data transfer architecture can include that the analysis can begin in a portion of data, such as on one or a first few rows of the images, while other portions of the data, such as the last rows of the images, are being transferred or are still waiting to be transferred from the camera units. This can allow fast response from the CPU, such as to change the image parameters of the camera units or of the accompanied hardware, such as the illumination source, the sample stage, or the sample temperature. Changing the illumination, sample position, or other environmental parameters can often be a slow process. Thus the ability of the disclosed data transfer architecture to quickly identify new imaging parameters can significantly reduce the total imaging time of an experiment.

In some embodiments, the disclosed data transfer architecture can reduce or avoid the dead time between image processing and imaging parameter selection, based on the ability to start analyzing partial image frames while the rest of the image frames are in transit. For example, the ability to start analyzing a portion of the image before the entire image has been received can allow the CPU to change the imaging parameters before the next frame acquisition starts.

In some embodiments, the disclosed data transfer architecture can enable an associated computer processor to rapidly take action based on the received partial data from multiple image sensors, e.g., camera units, and to adjust global and local imaging parameters as needed to enhance the image acquisition strategy. The data transfer architecture can allow acquiring multiple simultaneous images with little delay through the combined design of electronic hardware, firmware and analysis software on the CPU. Key advantages of the data transfer architecture, and systems incorporating the data transfer architecture, include that data is arrived in portions, that data portions are available to the CPU with minimal delay after arriving, and that the CPU can start analyzing the earlier data portions while the later portions are still in transfer. This can be critical for many applications, such as in microscopy, where decisions must be made depending on the observed measurements from a sample. This is true in various biological applications where stimuli are to be applied to a model organism to better understand their behavior under different scenarios.

In some embodiments, the data transfer process can be applied to systems with multiple high volume data acquisition streams, such as in a computational microscope system. When capturing images simultaneously, this type of microscope can generate gigabytes of image data per second, each snapshot containing a few hundred megabytes of data. The systems incorporating the data transfer process can minimize the delay from the time an operator defines the microscope's settings to the time the acquired images with their properties and characteristics are viewed. The systems can thus enable the operator to rapidly take action based on the received data to adjust global and local imaging parameters to enhance the image acquisition strategy.

FIG. 1 illustrates a schematic of a microscope system having the disclosed data transfer process according to some embodiments. A microscope system 100 can include multiple camera units, which can be arranged in a camera array 110, configured to capture multiple images to be processed by a central processing unit (CPU) 130 or other computational unit such as a graphical processing unit (GPU). Multiple parallel data streams 111 from the camera array 110 can be organized into a serial data stream 121 carrying data packets, which are directly transferred to the memory 131 associated with the CPU 130. Each data stream 111 can include a sequence of image frames captured from a camera unit of the camera array. For example, if the camera array is configured to capture only one image, the sequence of image frames in each data stream 111 includes only one image. If the camera array is configured to capture multiple images in sequence, the sequence of image frames in each data stream 111 includes a series of the multiple images. The serial data stream 121 can include a sequence of data packets, with a data packet containing a portion of an image frame captured by any camera unit of the camera array.

In the specification, the term CPU can include any computational unit, processor, or microprocessor, including central processor unit, graphical processing unit, or other type processors such as Intel processors using Complex Instruction Set Computing, RISC (Reduced Instruction Set Computing) architecture, and ARM (Advanced RISC Machine).

The camera array 110 can receive clock signals from a common clock generator, for example, from a common module 112. The common module can be configured to carry image parameters to all camera units in the camera array, for example, to ensure that the camera units all have a common frame rate and imaging parameters. The common module can minimize timing variation between camera units in the camera array, which can allow synchronization or minimum variability between the multiple parallel data streams sending image data from the camera units to a processing module 120. After an image acquisition, sensor processing modules associated with the camera units can receive and pre-process the image data, such as performing image normalization, such as to correct dead pixels, pattern noise, brightness, and contrast, and then send the image data as multiple parallel streams 111 to processing module 120 for data organization before reaching the CPU to be processed. A data stream 111 can be configured to send images by images, e.g., sequentially sending the images sequentially captured by the camera unit couple to the sensor processing module sending the data stream 111. For each image transfer, the data stream can include lines by lines of the image, e.g., sequentially sending the lines of the image through the data stream 111. For each line transfer, the data stream can include pixels by pixels of the line of the image, e.g., sequentially sending the pixels of the line through the data stream 111.

The processing module 120 can be a parallel processing module, configured for data aggregation and preparation of the multiple parallel data stream before sending to the CPU for analysis. The processing module can be capable of communicating with many image sensors, such as less than 1000 or even higher, or such as between 10 and 500, or such as 384, simultaneously without interleaving communication between them. The processing module 120 can include a FPGA (field-programmable gate array), an ASIC (application-specific integrated circuit), an ASSP (application-specific standard parts) or a SoC (system on chip). The processing module can serve as a buffer stage between the camera array and the CPU, to ensure of the integrity and completeness of the data received by the CPU, even when the CPU is in a state in which it cannot receive data from the camera array without stopping the data acquisition. The processing module can serve as an intermediate stage between the camera array and the CPU, for example, to enable the CPU to be connected to many camera units or image sensors without the need for a custom CPU design, since CPU outputs and camera units can use different communication protocols and communication standards.

The processing module 120 can be configured to organize the multiple parallel data streams 111 into a serial data stream 121 carrying data packets. The data packets in the serial data stream can include origin information, e.g., information about which camera each data packet comes from, such as data packet 200 comes from camera 3, etc. In some embodiments, extra bits can be added to the data packets to indicate the originating camera. This extra data bits can be at the front of the data packet, or can be attached to every beat of data transmission within the routing circuit of the processing module. The origin information can be added to the data packets, in addition to the packet numbers designed to offer a fair share in sending data packets disclosed above.

The size of the data packet can be determined by the structure of the memory 131, for example, the data packet can have the size of a page of memory, such as 4096 bytes. As such, a data packet can contain less than one line of image, one line of image, or one line with one or more partial or complete lines of image. For example, a camera unit can have an image sensor of 4096×3100 pixels, e.g., having a row size of 4096 pixels. When the image is transmitted with 8 bits per pixel, e.g., in a data stream 111, a data packet corresponds to one page of memory of 4096 bytes, which corresponds to one row of data from an image sensor. For image sensors with different row sizes, 4096 bytes can correspond to partial rows of data from the image sensor, or multiple rows of a sensor, including a partial row.

The processing module 120 can simultaneously receive data from the multiple parallel data streams 111, such as a sequence of lines by lines of an image in each data stream 111. After receiving enough data from each data stream, the processing module can assemble the data into data packets and sequentially send out the data packets for all data streams before assembling next data packets for sending out.

For example, the processing module can wait until receiving enough line data from each data stream 111 to fill a data packet. The processing module can have multiple packet buffers, and can direct the incoming data streams 111 to fill in the packet buffers. After all packet buffers are filled with data, the processing module can send out sequentially data from the packet buffers to the memory. If a packet buffer is filled before other packet buffers are filled, the filled packet buffer can wait until all packet buffers are filled so that the data in the packet buffers can be sent out sequentially.

Due to the common clock and imaging parameters, there is minimum variability between the timing in the multiple parallel data streams 111, which leads to a minimum delay in the data organization into data packets. Further, the processing module can reorganize the incoming data from the multiple parallel data streams on the fly, and write each reorganized data packet directly to the desired location in the CPU memory, since there can be small variation in the timing (down to the 10s of nanoseconds) of when different bytes arrive to the processing module from the different parallel data streams.

The processing module can have a small buffer size, such as small enough to store a partial image frame in each image frame captured by the camera array. The small buffer size can reduce the cost and increase the availability of the processing module, which can employ a field programmable gate array (FPGA) having multiple inputs for receiving the multiple parallel data stream, and an output for sending out the serial data packet stream.

The system can be configured for matching bandwidths between multiple parallel data streams 111 and the serial data packet stream 121. For example, the bandwidth of the serial data packet stream needs to be larger than the combined bandwidths of the multiple parallel data streams. To increase the bandwidth of the serial data packet stream, multi-lane interface can be used. For example, a 16-lane PCIe interface can have a bandwidth 16 times larger than that of a single lane PCIe interface.

To further reduce delays, the data packet stream 121 can be configured to send data directly to the memory 131 associated with the CPU 130, for example, through a direct memory access configuration set up between the CPU 130 and the processing module 120. The direct memory access link can free up the CPU time, e.g., letting the CPU focusing on analyzing the data without spending CPU time on image data transfer.

The memory can be organized in contiguous memory to minimizing delay in writing and reading. For example, a first memory block can be configured to store a first image captured by a first camera unit. A second memory block can be configured to store a first image captured by a second camera unit, and so on until an nth memory block configured to store a first image captured by a last camera unit, e.g., the nth camera unit in the camera array. The memory block structure can be repeated for the second images captured by the camera units of the camera array, and so on.

Before running the system, e.g., when an operator sets up the system for data acquisition, the CPU 130 can send 140 memory address information, such as memory addresses or links to memory addresses at which the data packets to be stored, to the processing module 120. The memory addresses or the links to the memory addresses can be incorporated in the data packets during the data organization by the processing module, so that the data packets can be parsed to extract the packet data together with the address information of the memory in which to write the packet data. The memory addresses or the links to the memory addresses can be stored, as an address look up table or address parameters for an algorithm to calculate the address information. Each data packets, after being assembled, can obtain addresses from the look up table or from the address algorithm, in order to find the memory location to send the data packets. The memory location information can be added to the data packets by the processing module, in addition to origin information and the packet numbers designed to offer a fair share in sending data packets as disclosed above.

The CPU 130 can be configured to send 141 instructions, including image parameters, to the camera array, for example, through the processing module 120, so that the processing module repeats 142 the instructions to the camera array.

The CPU 130 can be configured to analyze data in the memory 131 as soon as the data is available in the memory, such as after a data packet for a partial image frame of a first image captured by a first camera unit, or after n data packet for n partial image frame of a first image captured by n camera units, e.g., all camera units in the camera array. The CPU can also be configured to respond after the analysis, such as sending new instructions to the camera array, for example, through the processing module, to change data acquisition parameters after analyzing a portion of the image, e.g., after analyzing a partial image frame transferred to the memory by the serial data packet stream.

In some embodiments, in operation, the system can start by getting operating parameters, for example, through an operator or through a control automation system. The system can organize the memory structure, and send out memory location information to a processing module, together with the operating parameters to be transferred to the camera array.

The camera array can start data acquisition, and parallelly sending multiple data streams to the processing module. The processing module can organize the data in the incoming data streams into data packets, after receiving enough data from each of the multiple parallel data stream, together with memory location of the data packets. The data packets are sent, through direct memory access, to the memory location associated with each data packet. The CPU can start analyzing the data packets, after receiving one or more data packets. The CPU can be configured to respond, such as generating new image parameters, based on the analysis of partial image frames contained in the data packets.

FIGS. 2A-2D illustrate flow charts for minimizing delays in a data transfer process according to some embodiments. In FIG. 2A, operation 200 minimizes delays in image capture in a computational multi-camera system by efficiently organizing data acquired simultaneously from multiple cameras to be sent to a computational system for analysis. The acquired data can be organized in data packets, with the size of the data packets suitable for an efficient data transfer to a memory structure. The data packets can be sent directly to the memory, for example, without assistance or contribution from a processor.

In FIG. 2B, operation 220 minimizes delay in image capture in a computational multi-camera system by receiving data acquired simultaneously from multiple cameras, followed by organizing the received data into data packets matching a memory structure of a computational system and by sequentially sending the data packets to the computational system for analysis while receiving subsequent data to be organized into data packets.

In FIG. 2C, operation 240 forms a computational multi-camera system with an processing module between the multiple cameras and the computational system, with the processing module configured to reorganize the data captured by the multiple cameras into data packets to be sent to the computational system for analysis while still in the process of receiving subsequent data to be organized into data packets. For example, the processing module can be configured to continuously sending data packets to memory of the computational module while being receiving data from the multiple camera units, with each camera configured to continuously send data to the processing module. The data packets can include sequential portions of image frames captured by each camera unit.

In FIG. 2D, operation 260 forms a processing module interfacing multiple cameras and a computational system, with the processing module configured to reorganize image frames captured by the multiple cameras into partial image frames to be sent to the computational system for analysis while still in the process of reorganizing subsequent partial image frames.

Micro-camera array microscope (MCAM) system In some embodiments, the data transfer process can be applied to system with multiple high volume data acquisition streams, such as in a computational microscope system of a micro-camera array microscope (MCAM) system. Details about the MCAM system can be found in patent application Ser. No. 16/066,065, filed on Jun. 26, 2018; and in patent application Ser. No. 17/092,177, filed on Nov. 6, 2020, entitled "Methods to detect image features from variably-illuminated images"; hereby incorporated by reference in their entirety, and briefly described below.

The MCAM system can be viewed as a group of multiple individual microscopes tiled together in an array to image a large sample. The individual microscopes can be configured into a micro camera package, e.g., forming a tightly packed array of micro-cameras with high resolution (0.25-10 μm) over a large area (hundreds of square centimeters). The images taken from the individual micro cameras, which include overlapped image patches of the sample, can be stitched together to form the image of the sample.

The MCAM system can include a programmable illumination system, such as a large array of light sources, with individual light sources or groups of light sources capable of being controlled separately, for example, by a controller. The light sources can be visible light sources, infrared light sources or ultraviolet light sources such as light emitting diodes (LEDs) or lasers with appropriate wavelengths. The illumination system can be placed below or above the sample, to provide transmissive or reflective light to the micro cameras.

The MCAM system can use multiple micro-cameras to capture light from multiple sample areas, with each micro camera capturing light from a sample area sequentially from multiple patterned illumination configurations provided on the same sample area.

The illumination system can provide the sample with different illumination configurations, which can allow the micro cameras to capture images of the sample with light incident upon the sample at different angles and wavelengths. The illumination angle and wavelength are important degrees of freedom that impacts specimen feature appearance. For example, by slightly changing the incident illumination angle, a standard image can be converted from a bright field image into a phase-contrast-type image or a dark field image, where the intensity relationship between the specimen and background is completely reversed.

Further, by providing the sample with different light angles and wavelengths, both intensity and phase information of the received illumination can be recorded, which can allow the reconstruction of an image, for example, with more information or higher resolution. The MCAM system can offer size, weight, complexity, and cost advantages with respect to standard microscopes. The MCAM system may not require any moving parts, and its micro-cameras fit within a compact space without requiring a rigid support structure and can thus operate within a small, confined space.

FIG. 3 illustrates a schematic MCAM system according to some embodiments. The MCAM system 300 can include an array of camera units 310 and a patterned illumination source 330 and 340 for microscopic imaging. The camera units 310 are configured to image partially overlapping field of views (FOV) 311 of image areas of a sample 320. The patterned illumination source 330 and 340 can be configured to provide radiation, e.g., electromagnetic waves including visible light, infrared and ultraviolet light, on the sample 320 from a plurality of angles and spatial patterns, so that the spatial-angular distribution of radiation reaching the sample changes over time.

The illumination source can include a bottom set of radiation source units 330, a top set of radiation source units 340, or both bottom and top sets of radiation source units 330 and 340. The illumination source can provide illumination patterns to the sample 320 of the MCAM system 300, in which there is either a transmission illumination through the bottom set of radiation source units 330, or a reflection illumination through the top set of radiation source units 340, disposed near the micro cameras. The illumination source can also provide a dual illumination geometry, in which there are a transmission illumination through the bottom set of radiation source units 330, and a reflection illumination through the top set of radiation source units 340.

The illumination source can be configured to generate multiple illumination patterns. At each illumination pattern in the spatial-angular distribution of radiation generated from the illumination source 330 and 340, each camera unit can acquire an image. The set of images acquired from the camera units for the image areas for the illumination patterns can be processed to form an image reconstruction of the sample. The image reconstruction can also offer at least a measure of sample depth, spectral (i.e., color) properties, or the optical phase at the sample plane.

The MCAM system 300 can include a controller for controlling the camera units, the radiation source units, and for processing the images. For example, the controller can include a central processing units 380, which can couple to a camera and light controller units 384 for controlling the camera units, e.g., to tell the camera units when to capture images, and for controlling the radiation source units, e.g., to tell the radiation source units when to be activated and what radiation source units to be activated. The central processing unit 380 can be coupled with the camera units to obtain the image data captured by the camera units. The data can be stored in memory 381, can be processed in a post processing dataset 392, and can be displayed 383 on a display or to send to a final storage.

Figure 4A:
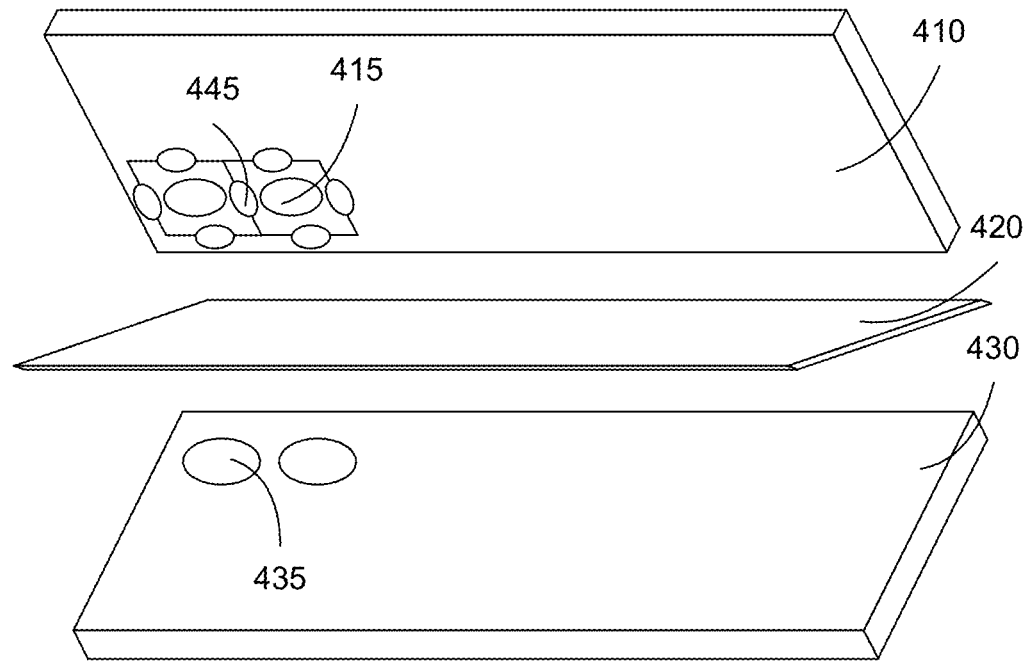
FIGS. 4A-4B illustrate a configuration for a MCAM system according to some embodiments.
Figure 4B:
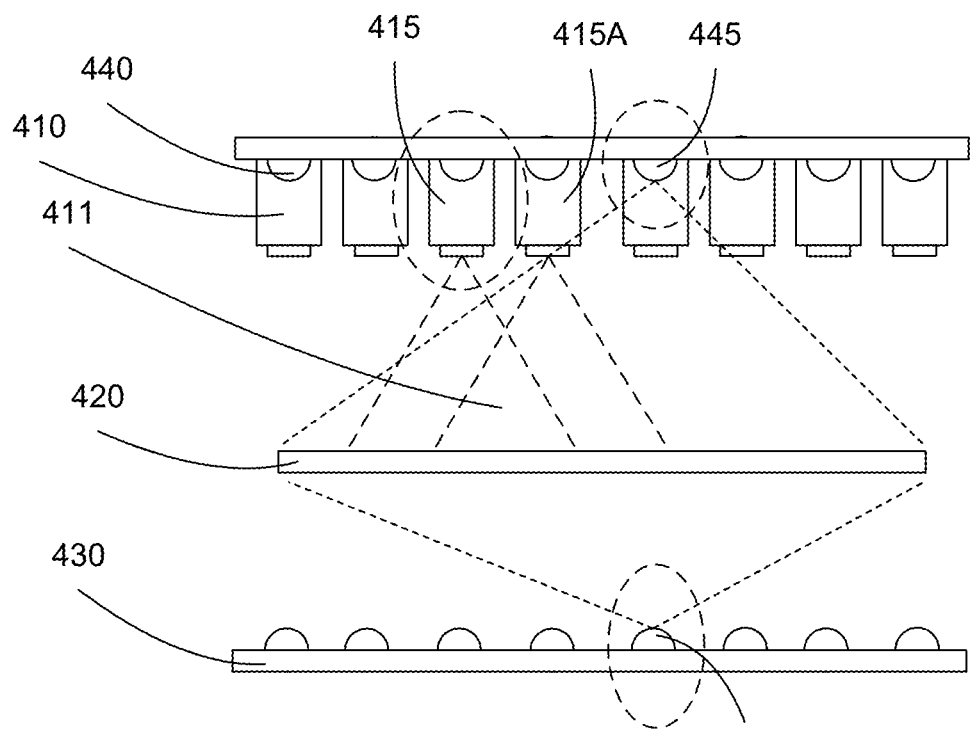

FIGS. 4A-4B illustrate a configuration for a MCAM system according to some embodiments. FIG. 4A shows a perspective view and FIG. 4B shows a cross section view of a MCAM system. The MCAM system can include a camera array and an illumination source, which are controlled by one or more controllers, such as a camera controller, an illumination controller, and a system controller.

An MCAM system can include an array of camera units 410 focused on a large sample 420 under the illumination of an array of radiation source units 430 and 440 such as LEDs or other light sources. A controller can be used to control the illumination system to provide variably illuminated radiation patterns, e.g., multiple illumination patterns with each pattern different from other patterns, to the sample.

Each camera unit in the camera array can focus on a sample area, having overlapping areas 411 with nearby camera unit to allow for stitching for fusing. Each camera can acquire multiple images under different illumination patterns. The captured images can be stitched and fused together to form a high dimension image reconstruction of the sample.

The imaging process starts by capturing k sets of variably-illuminated images from k illuminated patterns. The variably illuminated radiation patterns include multiple illumination patterns in which the radiation is from different radiation source units. For example, an illumination pattern can include radiation from a single radiation source unit.

Thus, if the radiation source unit in an illumination source is activated one at a time, there can be k illumination patterns for an illumination source having k radiation source units. For example, an illumination source can have 50 radiation source units. When the radiation source unit is activated one at a time, there are 50 illumination patterns, with each pattern including radiation from a radiation source unit.

In some embodiments, different illumination patterns can be provided by a programmable array of radiation source units 435 and 445, with different radiation source units activated to emit radiation to the sample. Each radiation source unit can be configured to cover the whole sample, e.g., radiation from a radiation source unit can reach all areas of the sample. The programmable radiation source array can include radiation source units that are at different positions above or below the sample, as well as radiation source units that emit different frequencies (i.e., colors) of radiation. The radiation source units can include light emitting diodes (LEDs), individual lasers, laser diodes, spatial light modulators or other electronically controllable light emission elements.

The variably-illuminated images can be captured by a camera array, with each camera unit 415 in the camera array capturing an image. The camera array can include n camera units, with each camera unit configured to capture an area of the sample. Adjacent camera units 415 and 415A can be configured to capture images having an overlapped area 411 images. The n camera units can be arranged to capture an image of the whole sample, having n overlapping images.

The camera units in the camera array are all activated at a same time for each illumination pattern to capture images. Thus, for each illumination pattern, there can be a set of n images. For example, a camera array can have 50 camera units. There is a set of 50 images captured under one illumination pattern. The set of images can be stitched together to form an assembled image of the sample.

Under k different illumination patterns, there can be k sets of assembled images, each captured under a different angle and spatial pattern. The image reconstruction of the sample, obtained by fusing the k sets of assembled images, can contain the spatial-angular distribution of radiation reaching the sample. As such, the image reconstruction can offer a measure of sample depth, spectral properties, and the optical phase at the sample plane.

Figure 5:
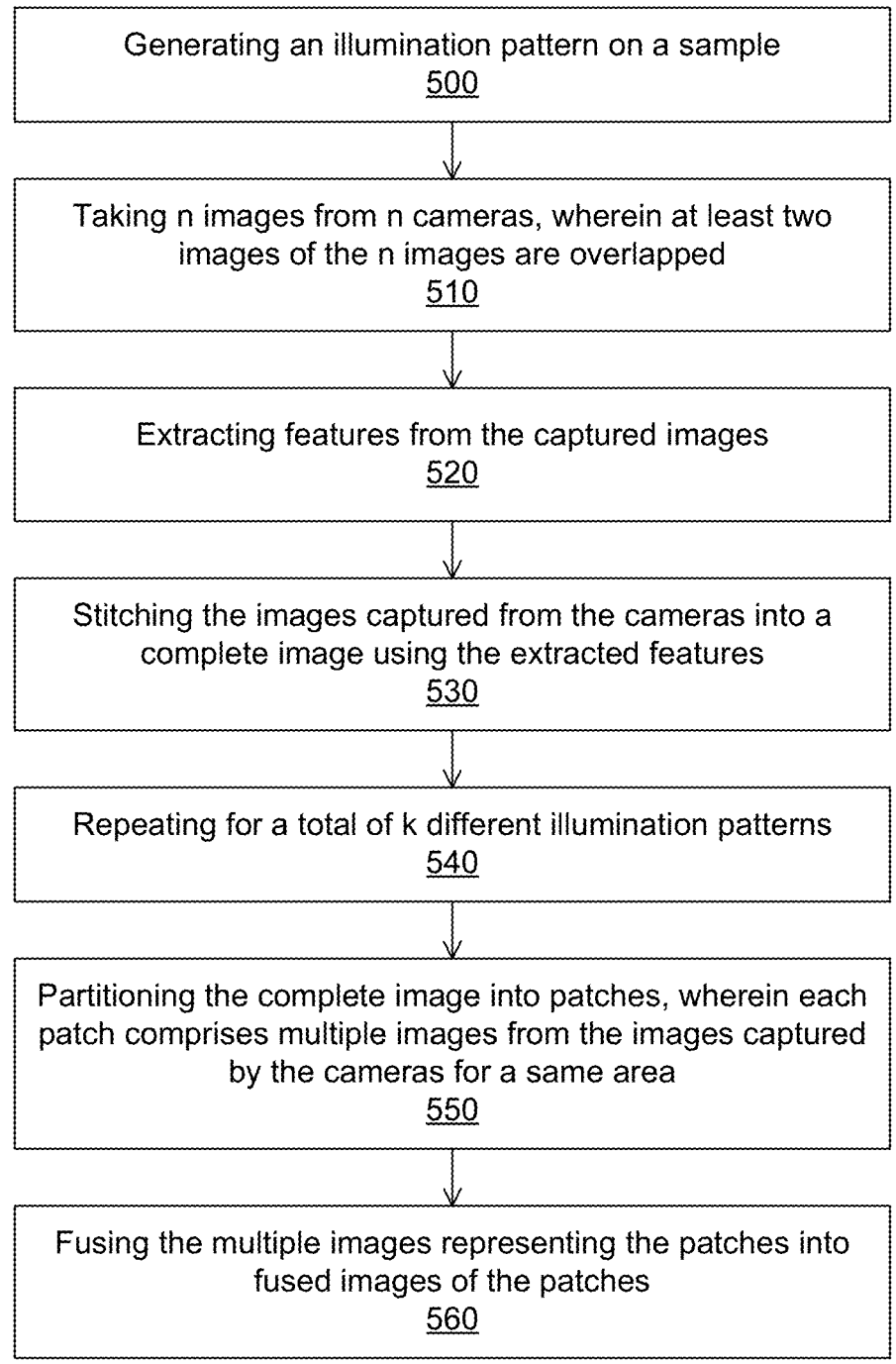
FIG. 5 illustrates a flow chart for operating an MCAM system according to some embodiments.

FIG. 5 illustrates a flow chart for operating an MCAM system according to some embodiments. The MCAM system can include a camera array and an illumination source, which are controlled by one or more controllers, such as a camera controller, an illumination controller, and a system controller configured to process the images captured by the camera array under multiple illumination patterns generated by the illumination source. The image processing process can include a stitching process to stitch overlapped image areas to form an assembled image of the whole sample. The image processing process can include a fusing process to fuse a set of assembled images under multiple illumination patterns to form an image reconstruction of the sample.

Operation 500 generates an illumination pattern on a sample. The illumination pattern can include radiation from one or more radiation source units from the illumination source. The illumination pattern can reach and interact with the sample, such as being partially or totally absorbed by the sample, being transmissive or reflective by the sample, depending on the location of the light sources, being scattered by the sample, or a combination of two or more interaction, such as partially absorbed and partially transmissive.

Operation 510 captures images from the camera units, for example, n images can be taken for a camera array having n camera units. The images can be overlapped, meaning adjacent cameras can capture some image data from a same image area. The images can also be non-overlapped and observe different areas of the sample. Movement of the sample by a sample stage can be used to bring the sample into view at different micro-cameras while multiple images are acquired by each micro-camera, such that the entire sample area may be observed within the captured image data for subsequent processing. The cameras can be positioned so that the camera array covers the whole sample, e.g., every areas of the sample are captured by one or more camera units.

Operation 520 extracts and describes features to form feature descriptors for the n images captured by the camera units under the illumination pattern. A feature can be described by a descriptor.

Operation 530 stitches the images into an assembled image of the sample by matching the descriptors of the extracted features. For example, the feature descriptors in each image can be matched against feature descriptors in other images, and the images can be transformed to allow the overlapping of the matched descriptors to form an assembled image. After the stitching process, the assembled image can include n individual images captured by the n camera units under the illumination pattern.

A first step in the stitching process can include matching the identified descriptors in each image of the n captured images. The descriptors have been extracted and described for the features on each image. The matching of descriptors can allow the alignment of the images to form an assembled image. After matching the descriptors, the images can be aligned to form the assembled image.

The identification and matching of descriptors can be performed on multiple images, or alternatively, on individual images. For multiple images, two images can be stitched together, even though there are no matched features on the two images. The two images can be stitched together based on the matching of the descriptors, which can perform the alignment for all images.

An assembled image of the sample can be an image representing an area of interest on the sample. In some embodiments, the sample image can be considered as the image of the whole sample, since the whole sample is typically imaged. In some embodiments, only an area of interest on the sample is imaged.

The sample image can be large, e.g., larger than an image captured by a single camera of the camera array. Further, the sample image is configured, e.g., positioned in the microscope, in such as way so that the images captured by the camera array cover the area of interest on the sample, e.g., stitching the images captured by the camera array can allow the formation of sample image.

Operation 540 repeats for a total of k different illumination patterns. The repetition process can include generating a different illumination pattern, taking n more images from the n camera units, extracting features and stitching the images together to form another assembled image. The repetition process can continue until there are a total of k illumination patterns, e.g., when the number of illumination patterns reaches a predetermined number.

Each illumination pattern can be different and the set of illumination patterns can be configured to provide complete information of the sample to be captured by the cameras. After k illumination patterns, there can be a set of k assembled images, with each assembled image including n images captured by n camera units under an illumination pattern, stitched together.

Operation 550 partitions the set of k assembled images into patches. The partition process can partition a sample image into multiple patches. Thus, the partition process can partition the set of assembled images into multiple sets of patches, with each patch in a set of patches being the same partitioned area in each sample image of the set of assembled images. The patch partition can be selected to simplify the reconstruction of fused images from the sets of patches.

Each set of patches can include multiple patches, with a patch being the area portion on a sample image of the set of sample images. A patch can be a portion of a sample image, which can be smaller than the image captured by a camera. Thus, an image captured by a camera can include one or more patches. A patch can be at an overlapped area between multiple cameras, and thus there can be multiple patches representing an area on the sample image that is captured by multiple cameras. For example, if the patch is at the overlapped area of 2 cameras, there are two patches in a sample images stitched together from all cameras for a particular illumination pattern. For k illumination patterns, a set of patches can include 2 k patches, for areas of the sample overlapped by two cameras.

Operation 560 fuses the multiple patches in each set of patches into fused patches. For example, the patches in a set of patches can be fused together to form a fused image of the patch. The fusing process thus can produce a high resolution image for the patches.

Each set of k images from each camera can be fused, e.g., processed to combine into one image. Since each image of the set contains different information about the image area, such as the transmissive or reflective light data and the scattered light data from different light angles, images in the set can be processed to combine this information to a fused image carrying both intensity and phase information.

In the fusing process, a complex function S, e.g., having intensity and phase information, representing the sample area, can be determined from the set of k images. When an image of the sample area is captured by a camera, only the intensity is captured, e.g., the phase information is lost to the camera, and a 2D image is formed to represent the 3D sample with finite thickness. By taking a set of images with different illumination patterns representing lights having different phases reaching the camera, the phase information can be reconstructed to generate a representation of the 3D sample with finite thickness.

For example, the sample area represented by the set of k images can be described as a complex function S. The MCAM system can capture k images of the sample area, meaning the complex function S is transformed into a set of k images M through a system matrix T that describes the MCAM image formation process, which can determined from the geometry of the MCAM setup, including the light paths from the light sources to the camera.

$$M=\|T \cdot S\|^2 + n$$

The set of k images M is the result of the transformation of the system matrix M with the sample function S. Here, the absolute square term is due to the ability to detect only intensity by the camera, and n is an additive Gaussian noise.

The sample function S can be calculated from the above function by solving the inverse problem. A possible approach for the inverse problem is to minimize the mean-squared error between the measured magnitudes and an estimate of the sample function. Another possible approach is to minimize a related negative log-likelihood function, which is based on a Poisson noise prior. Another possible approach is to treat the problem as a cost function, using appropriate minimization algorithms, such as Douglas-Rachford algorithm.

In some embodiments, an approach for the inverse problem is to solve the minimization problem by constructing an Augmented Lagrangian and then minimizing the Augmented Lagrangian with gradient descent. In some embodiments, the inverse problem can be solved using an iterative optimization strategy that first determines the gradients, or the gradients and the Hessians, and then applying a Gauss-Newton method. In some embodiments, the sample may be fluorescent and function S can be a real, positive-valued function, and a minimization method similar to those used in structured illumination fluorescent microscopes to determine a high-resolution sample can be used. The image reconstructions process can also include an estimate of the sample height, the sample phase, and its spectral color content.

The fused patches can then be assembled to produce a final, large, high-resolution image reconstruction of the sample. The final image can include a measurement of depth at different spatial locations across the image. The final image can include a measurement of the optical phase at different spatial locations across the image. The final image can include a measurement of multi-spectral content at different spatial locations across the image.

Partial Image Frame for Quick Response

In some embodiments, the present invention discloses a data transfer process for image streams using data packets containing partial image frames. For example, multiple camera units can simultaneously capture images from a sample and send to a processor for analysis. The data transfer process can include organizing the image frame data into multiple partial image frame data, e.g., data packets, to send to the processor. The partial image frame data stream can allow the processor to respond based on partial acquired images, for example, by changing image parameters of the camera units before the next image is acquired. The quick response of the processor can be possible due to the analysis can be performed on first few rows of image data while the last few rows are being sent to the processor.

The disclosed data transfer process can be used in a fast changing environment, such as in automation with robotic interactions, where a quick response is desirable.

Figure 6:
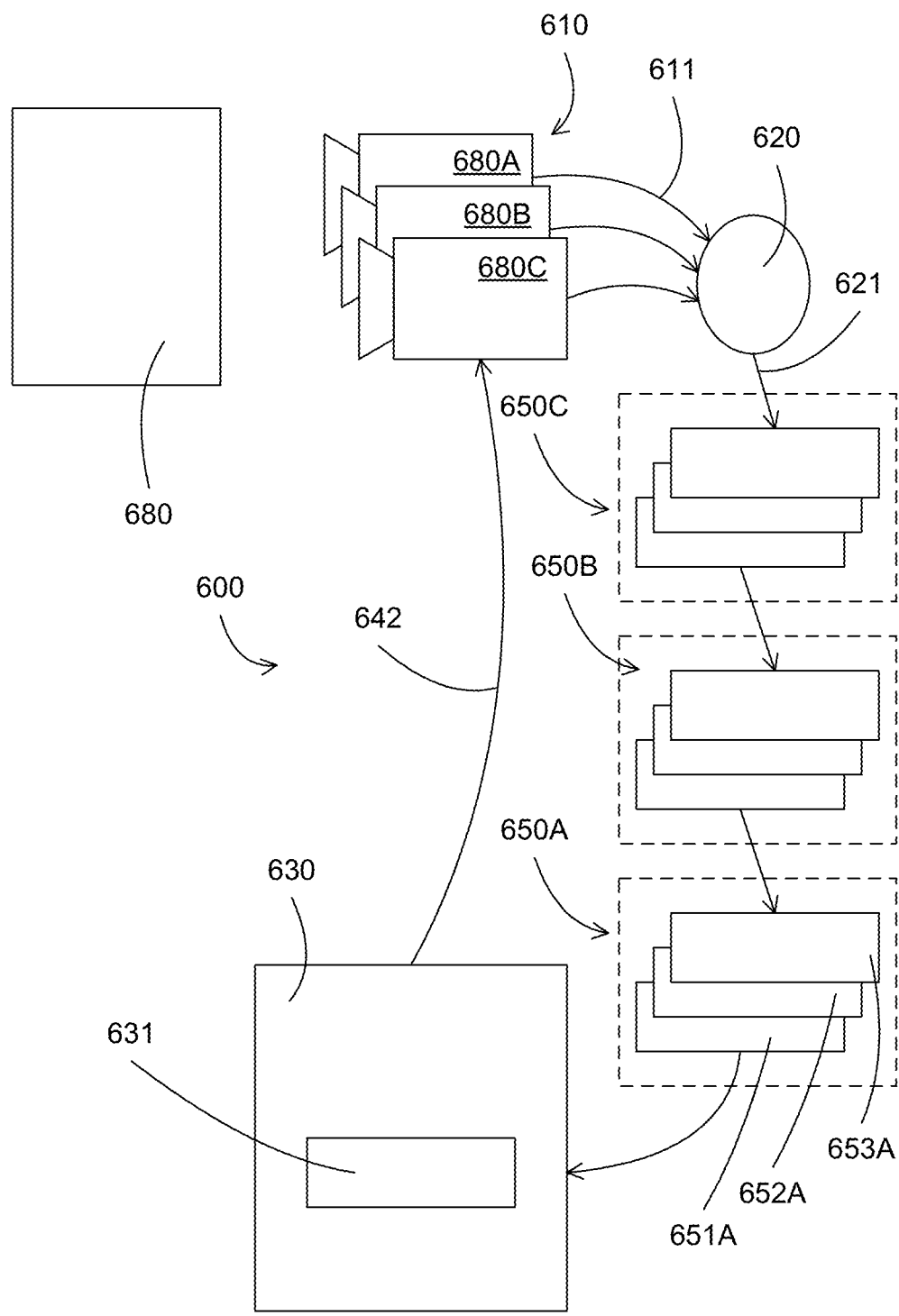
FIG. 6 illustrates a system configuration for data packet transfer according to some embodiments.

FIG. 6 illustrates a system configuration for data packet transfer according to some embodiments. A microscope system 600 can include multiple camera units, which can be arranged in a camera array 610 to capture images. The images can be processed, and/or presented to a user in an interactive fashion. For example, the user can have the ability to focus or defocus, or to move the focus to another portion of the sample.

The camera array can be configured to capture multiple images of a sample 680, with the multiple images optionally being overlapped for stitching. After the multiple images are acquired, the images are sent to a processor 630 for analysis, and optionally to communicate with the camera array 610 to change image parameters. After each camera unit capturing an image, the camera units can send the captured images in parallel data streams 611 to the processor 630, e.g., each camera unit sends its captured images in a data stream, and the data streams from the camera units are sent in parallel.

In some embodiments, the system can be configured to send data in data packets from the camera array 610 to the processor 630. Each data packet can include a partial image frame of an image captured by a camera unit. By sending data in partial image frames, delays in data transfer can be minimized, leading to possible rapid responses by the processor based on the analysis of on the partial image frames. For example, the system can provide new instruction 642 to the camera array after analyzing a first portion of the captured image, leading to the camera array receiving the new instruction for setting the new image parameters before the last portion of the image is sent. Thus, the processor can provide new instruction for the camera array to capture the next image before just after the camera array completing the current image, and before preparing for the next image.

The data organization into data packets can be accomplished by a processing module 620, which is configured to accept multiple parallel input data streams 611 from the camera array, and which is configured to output a serial data packet stream 621. The data packet stream can be a sequence of partial image frames sending in a round robin configuration, to allow the processor to construct a partial assembled image from the received multiple partial image frames.

For example, images 680A, 680B and 680C of a sample 680 can be captured by the camera array, e.g., each camera units of the camera array is configured to capture an image of the sample, resulting in 3 camera units capturing 3 images 680A, 680B and 680C. The images are sent to the processing module 620, pixels by pixels and lines by lines, in parallel data streams, e.g., simultaneously. The processing module 620 can organize the receiving data into data packets, with each data packet containing a partial image frame of the captured images 680A, 680B and 680C, to send to the processor 630, such as sending directly to the memory 631 to reduce usage time of the processor.

The processing module 620 can first simultaneously receive first partial image frames 650A-650C, which correspond to first portions of the images 680A, 680B and 680C, respectively. For example, image 680A is sent in a data stream from a camera unit, through a sequence of pixels by pixels and lines by lines. Thus, after the processing module 620 receives enough data from the data stream for a data packet, the processing module can organize the received partial image frame of the image 680A into a data packet 651A. Simultaneously, the processing module also receives and organizes the received partial image frame of the image 680B and 680C into data packets 652A and 653A, respectively. The formation of the data packets 651A, 652A and 653A can be accomplished simultaneously, e.g., within the timing variation of the multiple data streams from the camera array, due to the parallel processing capability of the processing module 620. The data packets 651A, 652A and 653A can be sent, in a serial data stream, to the memory 631 of the processor 630. The process can continue for other data packets 651B, 652B, 653B and 651C, 652C, 653C of images 680A, 680B, and 680C, forming a serial data stream to carry the multiple images captured by the camera array to the processor in data packets of partial image frames. The process can continue for subsequent captured images by the camera array.

The data packets 651A, 652A and 653A are configured to represent an assembled portion 650A of the sample 680, e.g., the processor can process the data packets 651A, 652A and 653A to reconstruct a portion 650A of the sample 680.

The processor 630 can be configured to analyze data in the memory 631, e.g., analyzing the data packets after the data packets arrive and are available for reading. Since the data packets are sent in serial, a data packet, such as data packet 651A, can arrive first. The processor can start analyzing the data packet 651A. If there is a need for action after analyzing data packet 651A, the processor can send instruction 642 to the camera array for new image parameters, for example. The processor can continue analyzing data packets 652A and 653A, and can assemble the data packets 651A, 652A and 653A, such as stitching and fusing the data packets together, to obtain an assembled partial image frame 650A of the sample. If there is a need for action after obtaining the assembled partial image frame 650A, the processor can send instruction 642 to the camera array for new image parameters. The process can continue, with the processor enabled to quickly respond to the observed images, often before the next images are acquired.

Figure 7:
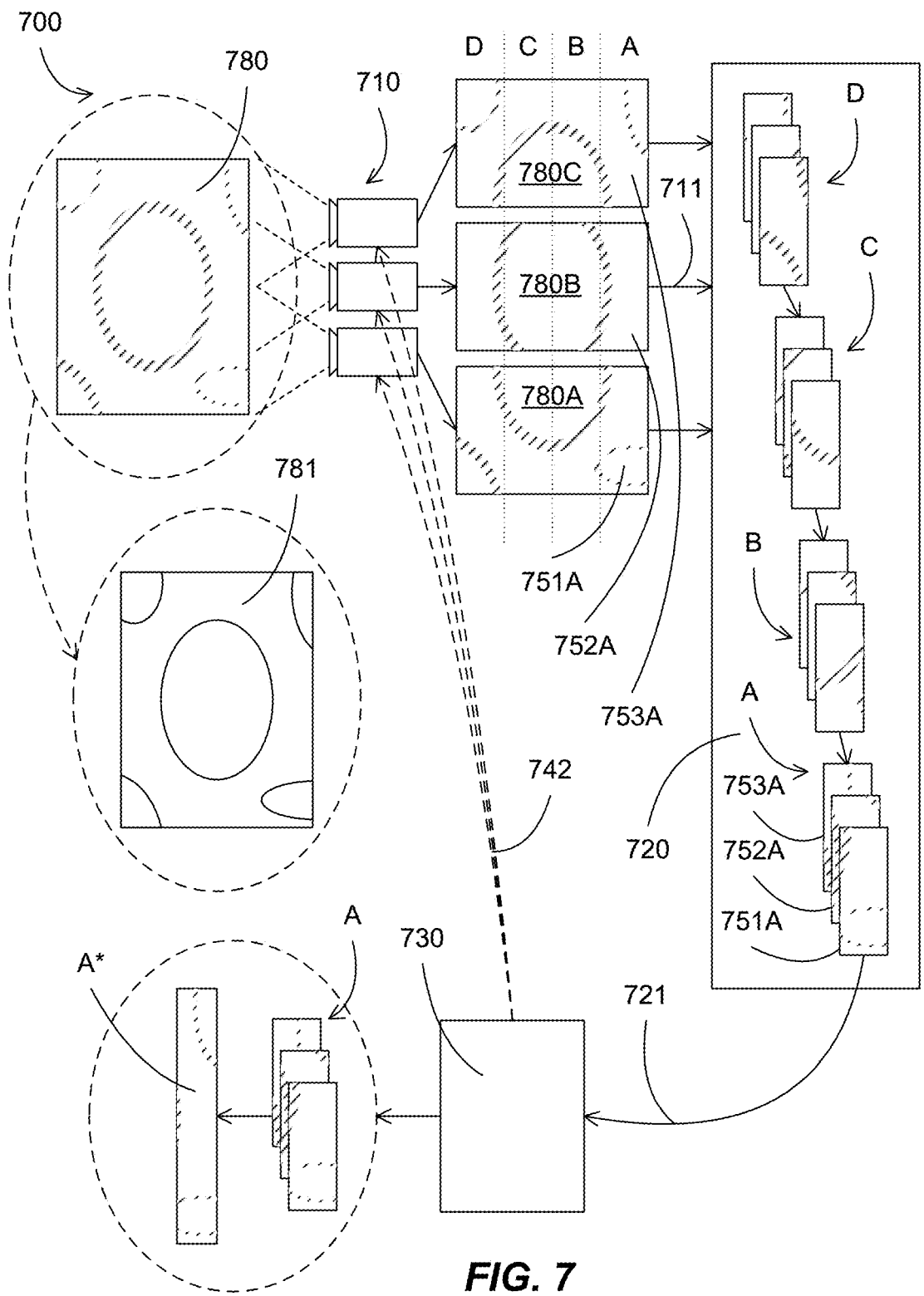
FIG. 7 illustrates a system response after receiving a data packet transfer according to some embodiments.

FIG. 7 illustrates a system response after receiving a data packet transfer according to some embodiments. A microscope system 700 can include multiple camera units, which can be arranged in a camera array 710 to capture images.

The camera array can be configured to capture multiple images 780A, 780B, and 780C of a sample 780, with the multiple images optionally being overlapped for stitching. After the multiple images are acquired, the images are sent, in multiple parallel data streams 711, to a processing module 720 for data organization, such as to organize the incoming data into data packets, which represent partial image frames of the captured images.

For example, a data packet can contain data in a portion of the image, e.g., data of a partial image frame, such as one line of the image or a few lines of the image. As shown, a captured image 780A, 780B, or 780C are configured to form 4 data packets A, B, C, and D per image, each data packet representing a portion of an image. For example, data packet 751A represents a first portion A of image 780A, data packet 752A represents a first portion A of image 780B, and data packet 753A represents a first portion A of image 780C.

After organizing the incoming image data in the multiple parallel data streams into data packets, the processing module 720 can send the data packets serially in a serial data stream 721 to the processor 730, such as directly to the memory 731 of the processor 730. The data packets 751A, 752A and 753A can be sent first in the serial data stream, followed by the data packets 751B, 752B, 753B, 751C, 752C, 753C, and 751D, 752D, 753D of images 780A, 780B, and 780C. The process can continue for subsequent captured images by the camera array.

The data packets 751A, 752A and 753A are configured to represent an assembled portion A of the sample 780, e.g., the assembled portion of all portions A of image 780A, 780B and 780C. The processor can process the data packets 751A, 752A and 753A to obtain an image reconstruction A* of the portion A of the sample 780.

The processor 730 can be configured to analyze individual data packets, such as data packet 751A. The processor can be configured to analyze a portion of the image, such as analyzing data packets 751A, 752A and 753A to obtain the image reconstruction A* of portion A of the image.

If there is a need for action, the processor can send instruction 742 to the camera array for new image parameters. For example, if the image reconstruction A* is shown to be out of focus, new image parameters can be sent to the camera array for the setting of the next image 781 to be acquired. The quick response can allow the system to analyze fast moving action, such as quickly setting parameters for next images based on the analysis of a partial image frame.

As shown, the right most portions, e.g., portions A, of the captured images are sent first to the processor to be analyzed. The processor response can thus be based on the analysis of the right most portion A.

In some embodiments, the system can be configured so that the processor can first analyze a particular partial image frame, e.g., a portion of the image showing an area of interest to the user. The camera array 710 can be configured to send the partial frames representing the area of interest first, before sending other partial image frames. For example, a camera unit can be equipped with a pre-processing module, which can be instructed to organize the image into the data stream with priority given to the area of interest.

FIGS. 8A-8D illustrate flow charts for a processing module to form a data transfer process according to some embodiments. In FIG. 8A, operation 800 sends streams of partial image frames, from a camera array, to a computational system for sequentially constructing a complete image frame from multiple composite partial image frames.

In FIG. 8B, operation 820 adjusts an operation parameter for next image frames when processing current image frames based on instruction from a computational system.

In FIG. 8C, operation 840 sends multiple streams of partial image frames to be sequentially received by a computational system, with the partial image frames being portions of image frames captured by cameras in a camera array.

In FIG. 8D, operation 860 sends multiple partial image frames to a computational system, with the computational system configured to constructing a composite image frame from the multiple partial image frames. Operation 870 receives an instruction from the computation system regarding operating parameters.

FIGS. 9A-9D illustrate flow charts for a processor to respond in a data transfer process according to some embodiments. In FIG. 9A, operation 900 responds to a camera array based on partial image frames received from cameras in the camera array.

In FIG. 9B, operation 920 instructs a camera array regarding capture operation on next image frames before the camera array finishes processing current image frames.

In FIG. 9C, operation 940 receives, by a computational system, multiple partial image frames captured by cameras in a camera array. Operation 950 sends an instruction relating to operation of the camera array based on a processing of the multiple partial image frames.

In FIG. 9D, operation 970 receives, by a computational system, sequences of multiple partial image frames, wherein each sequence comprises partial image frames of image frames captured by cameras in a camera array. Operation 980 constructs sequences of a composite partial image frame from the sequences of partial image frames, wherein a composite partial image frame is constructed from multiple partial image frames.

FPGA Processing Module to Send Stream of Partial Image Frames

Figure 10:
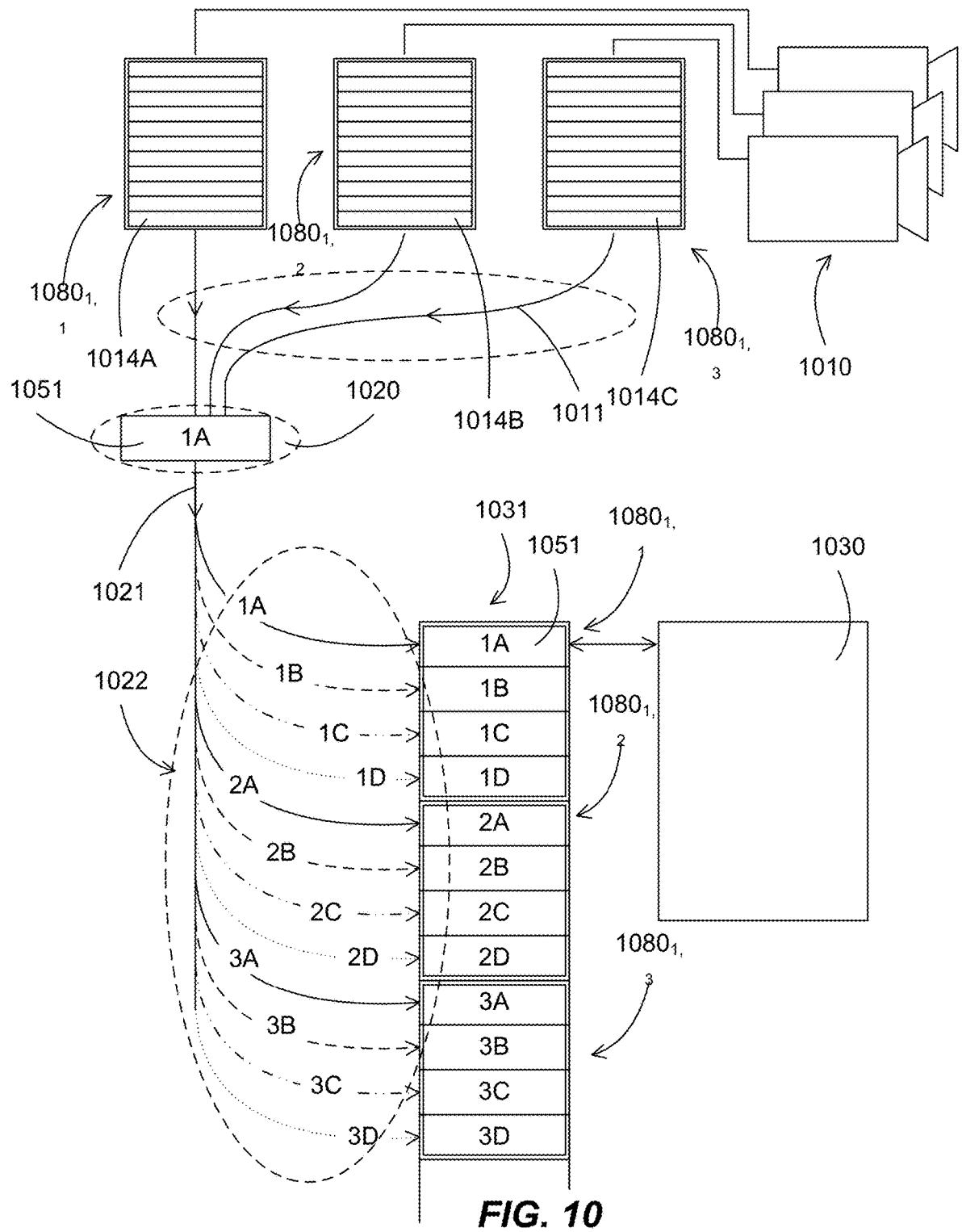
FIG. 10 illustrates a data flow configuration according to some embodiments.

FIG. 10 illustrates a data flow configuration according to some embodiments. Image data from multiple camera units are sent in multiple parallel data streams to a processing module. The processing module can organize the data in the multiple parallel data streams into a serial data packet stream using a cyclic time share algorithm to form cyclic sequences in which a data packet is obtained and sent from each of the multiple parallel data streams. The serial data packet stream is then distributed to a memory of a computational unit, so that the data packets for each image from each of the multiple parallel data streams are stored sequentially.

Camera units from a camera array can capture images $1081_{1,1}$-$1081_{1,n}$ from a sample. For example, each camera unit in a camera array of n camera units can capture an image, for example, to form a sequence of one image. In some embodiments, a series of images can be captured, one after the other, for example, to form an image sequence of more than one image, as in a video stream.

After an image is captured, a pre-processing module in each camera unit can optionally pre-process the data of the captured image, such as normalizing the image data and/or arranging the image data to form a data stream leaving the camera unit. The data rearrangement can be performed to provide the orders of the pixels and lines of the image, such as which lines of the image are sent first. For example, edge lines, e.g., data lines at an edge of the image, can be sent first. The process can continue until reaching the data lines at the opposite edge of the image. Alternatively, the pre-processing module can receive instruction from the computational unit, specifying a first sending area of the image, e.g., the area of interest in the image that the computational unit wants to process before the rest of the image.

The images captured by multiple camera units can be sent pixels by pixels and lines by lines, parallelly from the multiple camera units. For example, images $1081_{1,1}$, $1081_{1,2}$, and $1081_{1,3}$ can be sent lines by lines, in multiple parallel data streams 1011, with the bottom edge lines 1014A, 1014B, and 1014C being sent first. Thus, broadly speaking, a data stream 1011 can include a sequence of images, such as a sequence of one image or a sequence of multiple images, with each image captured by a same camera unit. In detail, the data stream 1011 can include a sequence of image data, e.g., data of one or more images captured by the camera unit. The sequence of image data can be characterized as bits by bits, bytes by bytes, or lines by lines, e.g., the bits, the bytes, or the lines of the images are sent in sequence in a data stream 1011. For example, a data stream 1011 can be characterized as including a sequence of the image $1081_{1,1}$ (and optionally other images subsequently captured by the same camera unit). The data stream 1011 can also be characterized as including a sequence of lines of the image, such as line 1014A of the image $1081_{1,1}$, followed by subsequent lines of the image $1081_{1,1}$. The data stream 1011 can also be characterized as including a sequence of bytes of the image, or a sequence of bits of the image.

A processing module 1020 can be configured to receive the multiple parallel data streams 1011, and can be configured to organize the received data into data packets 1051. Each data packet can contain one or more lines from the captured images. For example, a data packet for image $1081_{1,1}$ can contain one or more line 1014A.

Multiple data packets can be formed simultaneously from the multiple incoming data streams. For example, data packets 1A, 2A, and 3A can be formed at a same time, with the data packets 1A, 2A, and 3A containing one or more data lines 1014A, 1014B, and 1014C of images $1081_{1,1}$, $1081_{1,2}$, and $1081_{1,3}$, respectively, from each data streams 1011. After the data packets 1A, 2A, and 3A are formed in parallel, the data packets are sent in series, for example, data packet 1A is sent first, followed by 2A and 3A.

The process of forming and sending data packets can continue in a same way. For example, data packets 1B, 2B, and 3B are formed in parallel, and then sent in series of 1B, 2B, and 3B.

The data packets are sent to the memory 1031 of a computational unit 1030, such as by direct memory access, e.g., directly to the memory and bypassing the processor of the computational unit. The data packets can be distributed 1022 to the memory so that data packets belong to a same image are stored next to each other, in the order of formation. For example, data packet 1A is sent to first memory location reserved for image $1081_{1,1}$. The followed data packets 2A and 3A are sent to first memory locations reserved for images $1081_{1,2}$ and $1081_{1,3}$, respectively. The next data packets 1B, 2B, and 3B, 1C, 2C, and 3C, and 1D, 2D, and 3D, are sent to second, third, and fourth memory locations reserved for images $1081_{1,1}$, $1081_{1,2}$ and $1081_{1,3}$, respectively. Thus, data for the images are stored contiguously in memory, which can allow a fast writing to and reading from the memory.

FIGS. 11A-11B illustrate flow charts for forming a processing module configured for the disclosed data flow according to some embodiments. In FIG. 11A, operation 1100 couples a processing module to multiple camera units in a camera array, with the processing module configured to receive multiple streams of partial image frames from the camera units. Operation 1110 configures the processing module for sequentially transmitting the multiple partial image frames to memory of a computational system, with the multiple partial image frames transmitted in a round robin algorithm from the multiple streams with the time slot being the partial image frame. For example, a first data packet from a first stream is sent, followed by a first packet from a subsequent data stream, until the first data packet from the last stream. The process then cyclically repeats, with a next data packet from the first stream, followed by a next data packet from a next stream, until the next data packet from the last stream. The process can repeat for all data packets from the multiple streams.

In FIG. 11B, operation 1130 couples a processing module to multiple camera units in a camera array, with the processing module configured to receive multiple streams from the camera units. The processing module is configured to form sequences of partial image frames from each stream, with the partial image frames from the multiple streams are formed simultaneously. For example, a sequence of partial image frames include a first partial image frame from a first stream, followed by a first partial image frame from a second stream, until a first partial image frame from a last stream. The corresponding partial image frames in subsequent sequences form a full image frame capture by a camera unit. For example, if an image is organized into 3 partial image frames, a first partial image frame from a first sequence, a first partial image frame from a second sequence, and a first partial image frame from a third sequence are the partial image frames of a image, e.g., the three first partial image frames from three subsequent sequences can be re-assembled to formed the image that has been organized into three separate partial image frames.

Operation 1140 configures the processing module for sequentially transmitting the partial image frames in a round robin algorithm, with a time slot allocated for a stream being the time to send a partial image frame.

Operation 1150 configures the processing module for sending the sequentially transmitted partial image frames to memory locations of a computational system, with the memory locations configured to form contiguous memory location for the full image frames. For example, the three partial image frames of a full image can be stored in contiguous memory, for fast accessing the full image data.

Figure 12A:
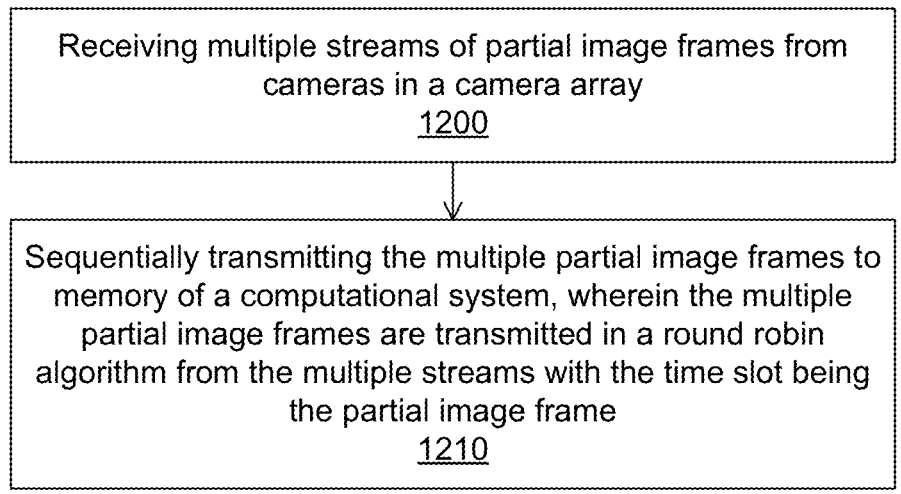
FIGS. 12A-12B illustrate flow charts for operating a processing module configured for the disclosed data flow according to some embodiments.
Figure 12B:
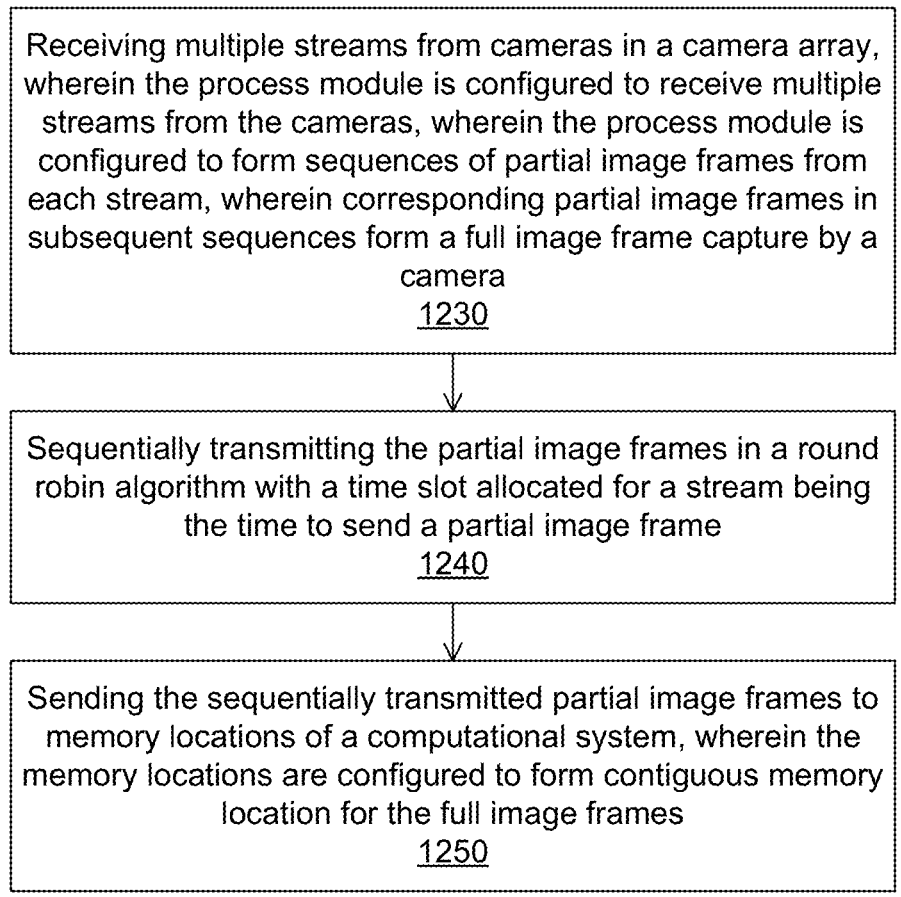

FIGS. 12A-12B illustrate flow charts for operating a processing module configured for the disclosed data flow according to some embodiments. In FIG. 12A, operation 1200 receives multiple streams of data from camera units in a camera array. Operation 1210 organizes the data into multiple partial image frames, and sequentially transmits the multiple partial image frames to memory of a computational system, with the multiple partial image frames transmitted in a round robin algorithm from the multiple streams with the time slot being the partial image frame. For example, a first partial image frame from a first stream is sent, followed by a first partial image frame from a subsequent data stream, until the first partial image frame from the last stream. The process then cyclically repeats, with a next partial image frame from the first stream, followed by a next partial image frame from a next stream, until the next partial image frame from the last stream. The process can repeat for all partial image frames from the multiple streams.

In FIG. 12B, operation 1230 receives multiple streams from cameras in a camera array, with the processing module configured to receive multiple streams from the camera units. The processing module is configured to form sequences of partial image frames from each stream, with the partial image frames from the multiple streams are formed simultaneously. For example, a sequence of partial image frames include a first partial image frame from a first stream, followed by a first partial image frame from a second stream, until a first partial image frame from a last stream. The corresponding partial image frames in subsequent sequences form a full image frame capture by a camera unit. For example, if an image is organized into 3 partial image frames, a first partial image frame from a first sequence, a first partial image frame from a second sequence, and a first partial image frame from a third sequence are the partial image frames of a image, e.g., the three first partial image frames from three subsequent sequences can be re-assembled to formed the image that has been organized into three separate partial image frames.

Operation 1240 sequentially transmits the partial image frames in a round robin algorithm with a time slot allocated for a stream being the time to send a partial image frame.

Operation 1250 sends the sequentially transmitted partial image frames to memory locations of a computational system, with the memory locations configured to form contiguous memory location for the full image frames. For example, the three partial image frames of a full image can be stored in contiguous memory, for fast accessing the full image data.

In some embodiments, the partial image frames can be organized in each camera unit of the camera array. For example, after the image is captured by an image sensor in a camera unit, the image data can be processed by a pre-processing module of the camera unit. The pre-processing module can organize the data into data packets, with each data packet being a partial image frame, e.g., having one or more lines, including partial lines, of the image frame. The pre-processing module then can send the data in a sequence of data packets to a processing module. The processing module can be configured to receive multiple parallel data packet streams from the multiple camera units, and can reorganized the data packets to send to the memory, such as incorporating the memory location for each data packet.

Figure 13:
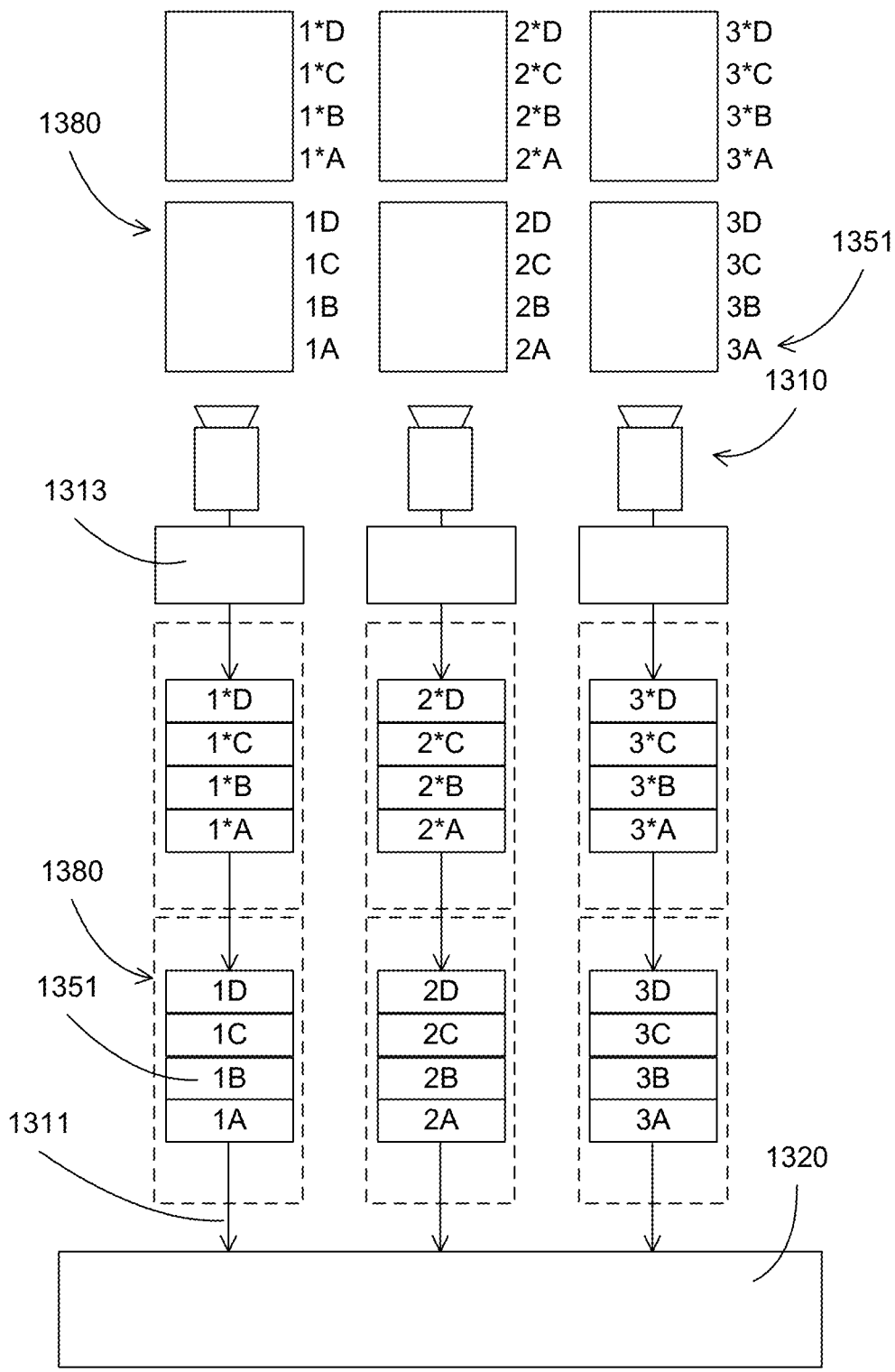
FIG. 13 illustrates a data flow configuration according to some embodiments.

FIG. 13 illustrates a data flow configuration according to some embodiments. Images 1380 can be captured from multiple camera units 1310. Each camera unit can have a pre-processing module 1313, for example, which can perform normalization of the image data and/or arranging the image data to form a data stream leaving the camera unit.

Each camera unit can be configured to send a stream of data of image frames, e.g., a sequence of data for the captured one or more images. For example, as shown, each camera unit captures two images in series, e.g., a first image having 4 image portions 1A, 1B, 1C, and 1D and a second image having 4 image portions 1*A, 1*B, 1*C, and 1*D.

In some embodiments, a camera unit is configured to send out a data stream, e.g., a stream of image data of the images captured by the camera unit. The term "image data" can mean data of the image, which can be characterized as bits, bytes, or lines of the image. And the data stream can include a sequence of the bits, bytes, or lines of the image. For example, as shown, the data stream can include sequential portions of the images. In some embodiments, there can be a gap between images, for example, a gap in data transfer between the first image having 4 image portions 1A, 1B, 1C, and 1D and the second image having 4 image portions 1*A, 1*B, 1*C, and 1*D, such as due to the data capturing process at the image sensors and the data transferring process from the image sensors. In some embodiments, the gap can be small in time.

A processing module 1320 can be configured to receive the multiple data packet streams from multiple camera units, and can re-organize the data packets to send to a memory of a computational unit. For example, each data packet can be re-organized to add a memory location or a link to a memory location where the data packet will be stored in the memory.

Figure 14A:
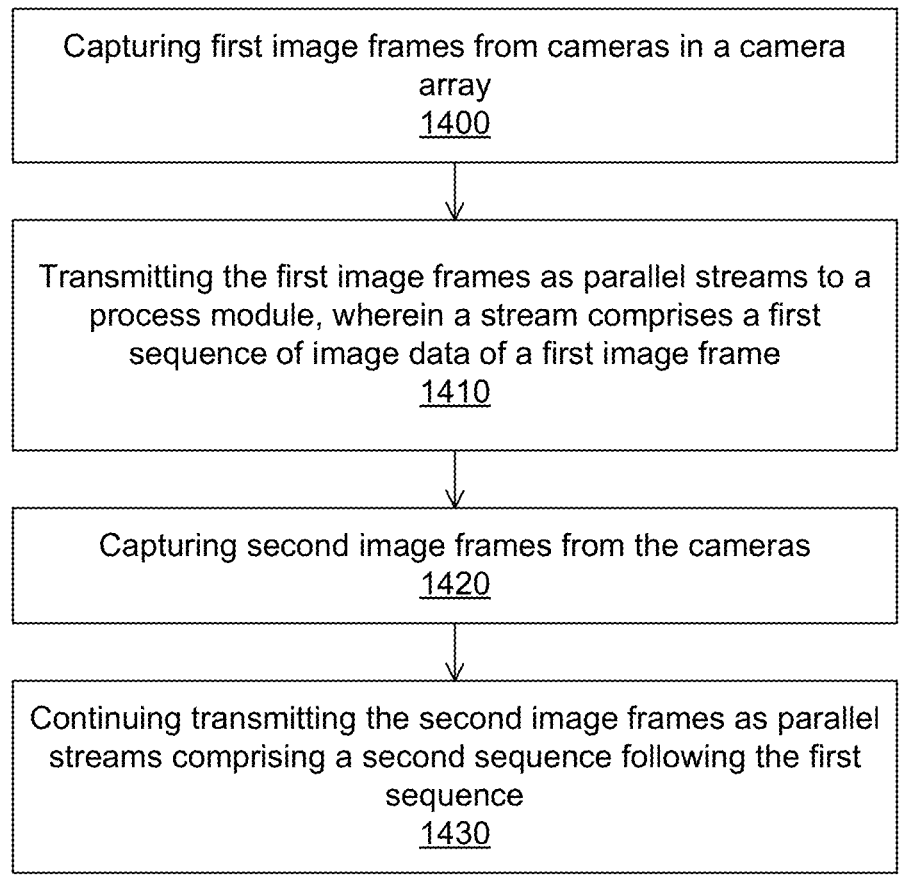
FIGS. 14A-14B illustrate flow charts for operating a camera unit configured for the disclosed data flow according to some embodiments.
Figure 14B:
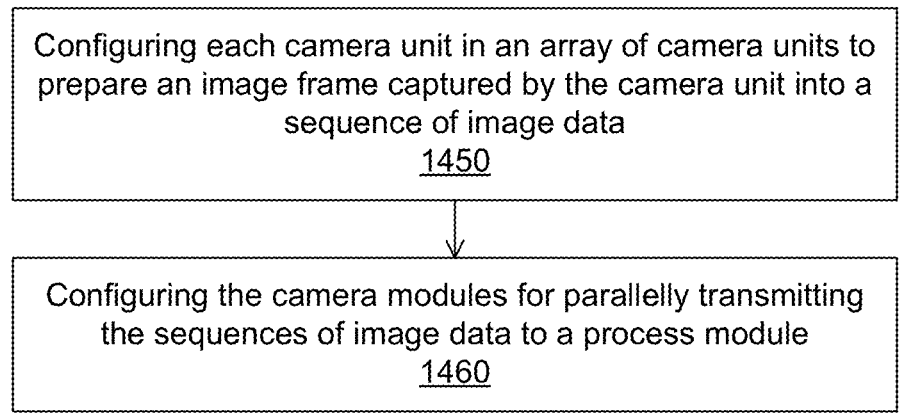

FIGS. 14A-14B illustrate flow charts for operating a camera unit configured for the disclosed data flow according to some embodiments. In FIG. 14A, operation 1400 captures first image frames from cameras in a camera array. Operation 1410 transmits the first image frames as parallel streams to a processing module, with a stream including a first sequence of image data of a first image frame. Operation 1420 captures one or more second image frames from the cameras. Operation 1430 continues transmits the second image frames as parallel streams having second sequences following the first sequence, with a stream including second sequences of image data of second image frames.

In FIG. 14B, operation 1450 configures each camera unit in an array of camera units to prepare an image frame captured by the camera unit into a sequence of image data. Operation 1460 configures the camera units for parallelly transmitting the sequences of image data to a processing module.

In some embodiments, a processing module can be configured to organize the multiple parallel data streams, e.g., the processing module is configured to simultaneously receive image data from multiple parallel streams from the camera units. For example, after the images are captured by the camera units, the camera units can send the image data, such as pixels by pixels and lines by lines, to a processing module. The processing module can organize the data into data packets, with each data packet being a partial image frame, e.g., having one or more lines, including partial lines, of the image frame. The processing module then can send the data in a sequence of data packets to a memory of a computational unit. The processing module can be configured to receive multiple parallel image streams from the multiple camera units, and can organized the received image data into data packets to send to the memory, optionally including incorporating the memory location for each data packet.

Figure 15:
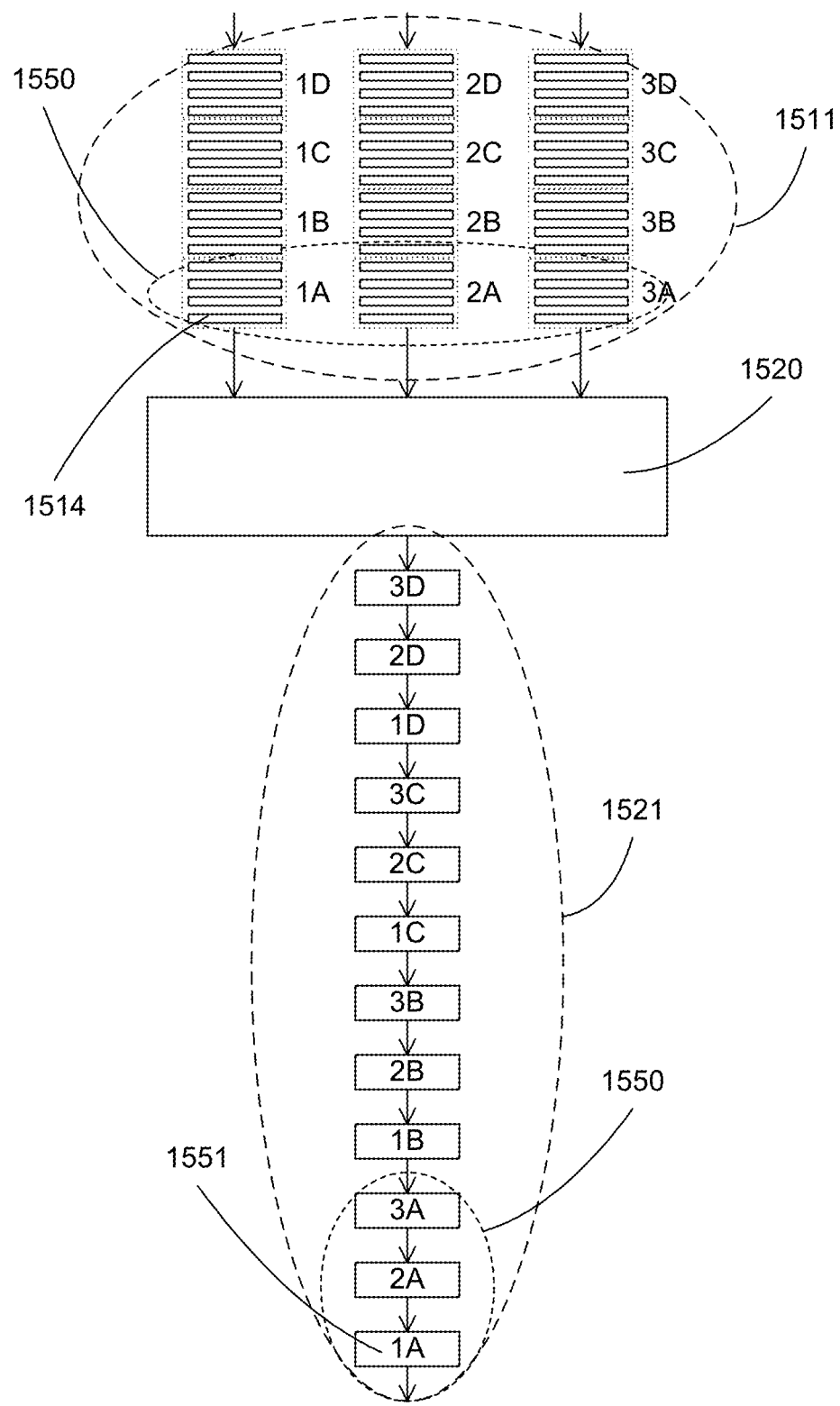
FIG. 15 illustrates a data flow configuration according to some embodiments.

FIG. 15 illustrates a data flow configuration according to some embodiments. A processing module 1520 can be configured to simultaneously receive multiple data streams 1511 from multiple camera units. Each data stream can include image data sending lines by lines, e.g., one line 1514 of data after another, with pixels by pixels in each line.

After receiving enough data in the data streams to form data packets 1551, the processing module can organize the incoming data into packets to be sent out in sequence. For example, a group 1550 of multiple packets received in parallel, e.g., simultaneously, from multiple data streams can be sent in series in a serial data packet stream 1521.

Figure 16A:
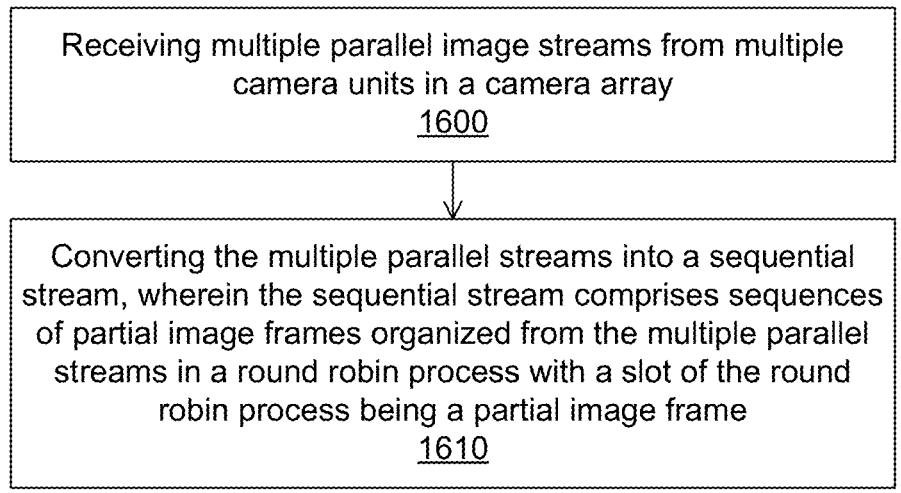
FIGS. 16A-16B illustrate flow charts for operating a processing module configured for the disclosed data flow according to some embodiments.
Figure 16B:
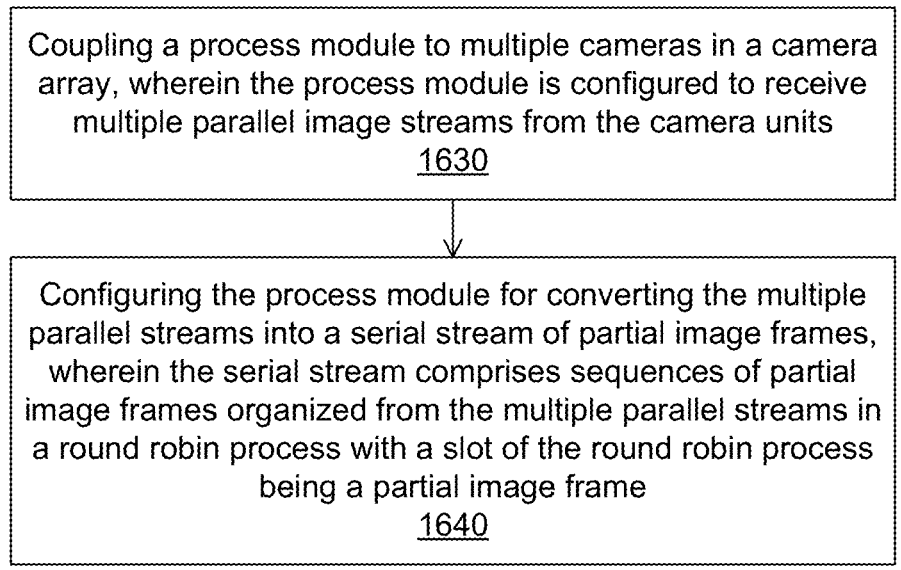

FIGS. 16A-16B illustrate flow charts for operating a processing module configured for the disclosed data flow according to some embodiments. In FIG. 16A, operation 1600 receives multiple parallel image streams from camera units in a camera array. The image streams can include sequences of bytes by bytes, pixels by pixels, or lines by lines of the captured images.

Operation 1610 converts the multiple parallel streams into a sequential stream, with the sequential stream having a sequence of partial image frames organized from the multiple parallel streams in a round robin process with a slot of the round robin process being a partial image frame.

In FIG. 16B, operation 1630 couples a processing module to multiple cameras in a camera array, with the processing module configured to receive multiple parallel image streams from the camera units. Operation 1610 configured the processing module for converting the multiple parallel streams into a serial stream of partial image frames, with the serial stream having a sequence of partial image frames organized from the multiple parallel streams in a round robin process with a slot of the round robin process being a partial image frame.

In some embodiments, a processing module can be configured with a small buffer, e.g., large enough to receive partial image frames and smaller than full image frames. The ability of the system to send images pixel by pixel and line by line enables the buffer to be as small as a few packets of data (each as small as 0.02% to 2% of the entire image) lowering the cost of the process module.

Figures 17A, 17B:
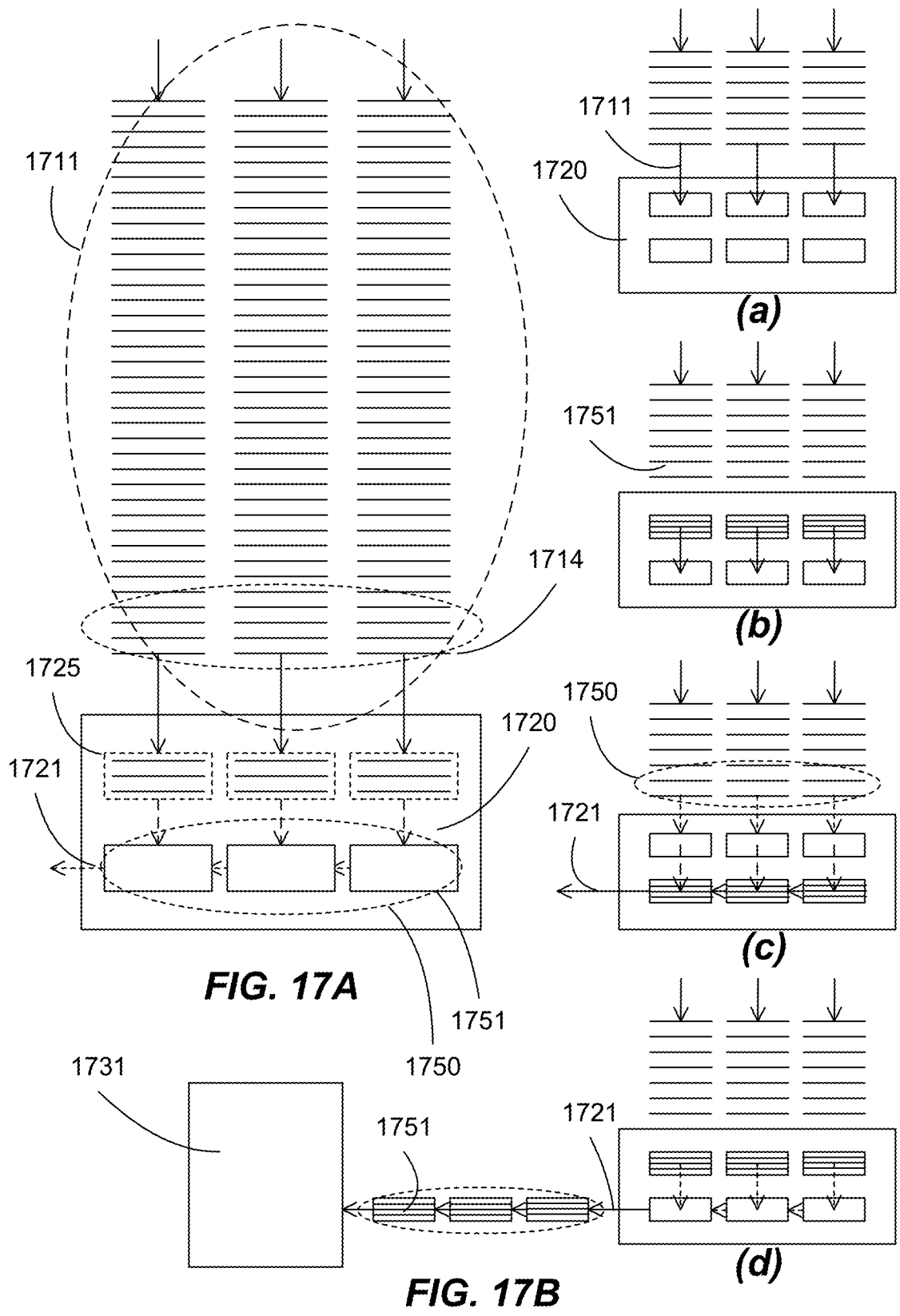
FIGS. 17A-17B illustrate a configuration for a processing module according to some embodiments.

FIGS. 17A-17B illustrate a configuration for a processing module according to some embodiments. In FIG. 17A, a processing module 1720 can be configured to receive multiple data streams 1711 from multiple camera units. Each data stream 1711 can include image data captured by a camera unit, and can include a sequence of image data, such as bytes by bytes sequences of the images.

The processing module 1720 can receive the image data into buffers 1723. A buffer can be configured to receive one or more lines 1714 of image data from a data stream. When the processing module receives enough data in the buffers, the buffer data can be organized into data packets, for example, having a starting address of the memory that the data packet is to be stored. The data packets in the buffers can be sent out, in series 1721, to the memory, according to the memory locations.

FIG. 17B(a)-17B(d) show a sequence in which the image data from multiple data streams is stored in buffers of a processing module, to be sent out in a serial data packet stream to a memory 1731.

Figure 18A:
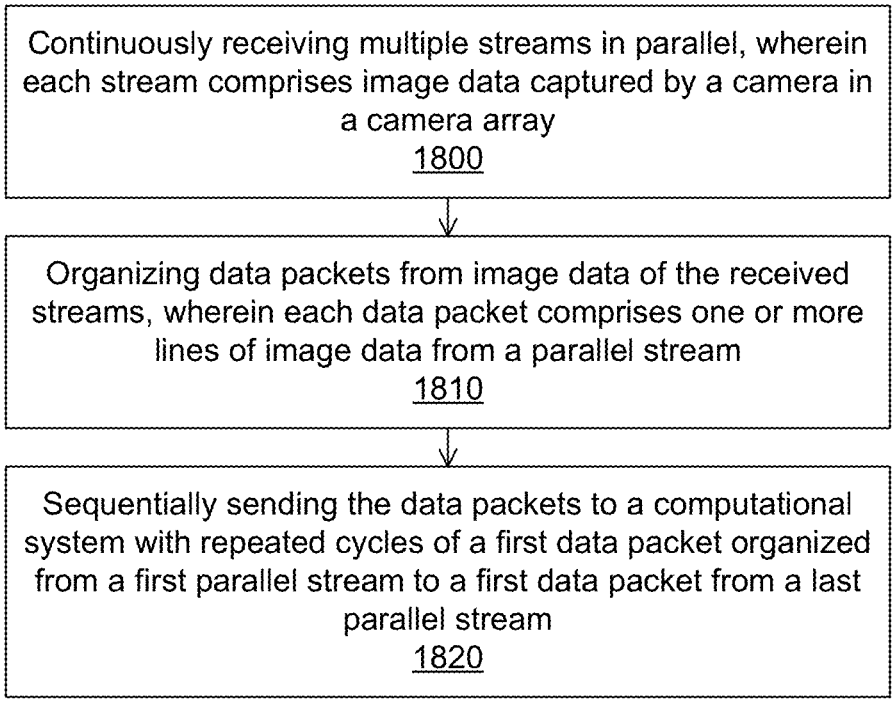
FIGS. 18A-18B illustrate flow charts for operating a processing module configured for the disclosed data flow according to some embodiments.
Figure 18B:
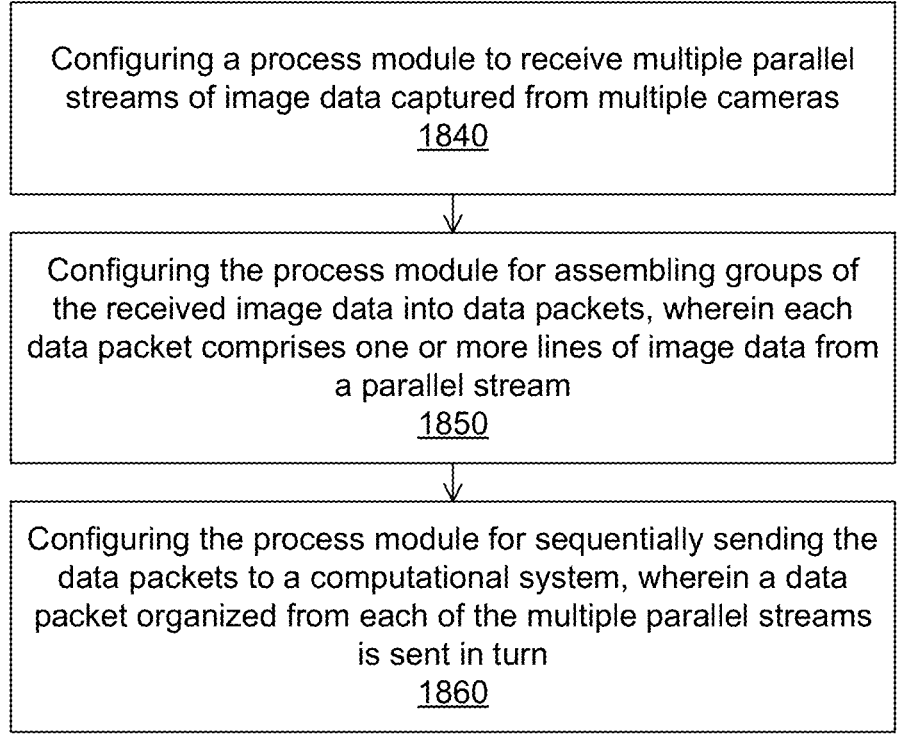

FIGS. 18A-18B illustrate flow charts for operating a processing module configured for the disclosed data flow according to some embodiments. In FIG. 18A, operation 1800 continuously receives multiple streams in parallel, with each stream including image data captured by a camera in a camera array. Operation 1810 organizes data packets from image data of the received streams, with each data packet including one or more lines of image data from a parallel stream. Operation 1820 sequentially sends the data packets to a computational system with repeated cycles of a first data packet organized from a first parallel stream to a first data packet from a last parallel stream.

In FIG. 18B, operation 1840 configures a processing module to receive multiple parallel streams of image data captured from multiple camera units. Operation 1850 configures the processing module for organizing groups of the received image data into data packets, wherein each data packet comprises one or more lines of image data from a parallel stream. Operation 1860 configures the processing module for sequentially sending the data packets to a computational system, wherein a data packet organized from each of the multiple parallel streams is sent in turn.

In some embodiments, a processing module can be configured to receive multiple image data streams from multiple camera units, and then organize the image data into data packets containing partial image frames. The data packets can be sent to the memory of a computational unit.

Figure 19:
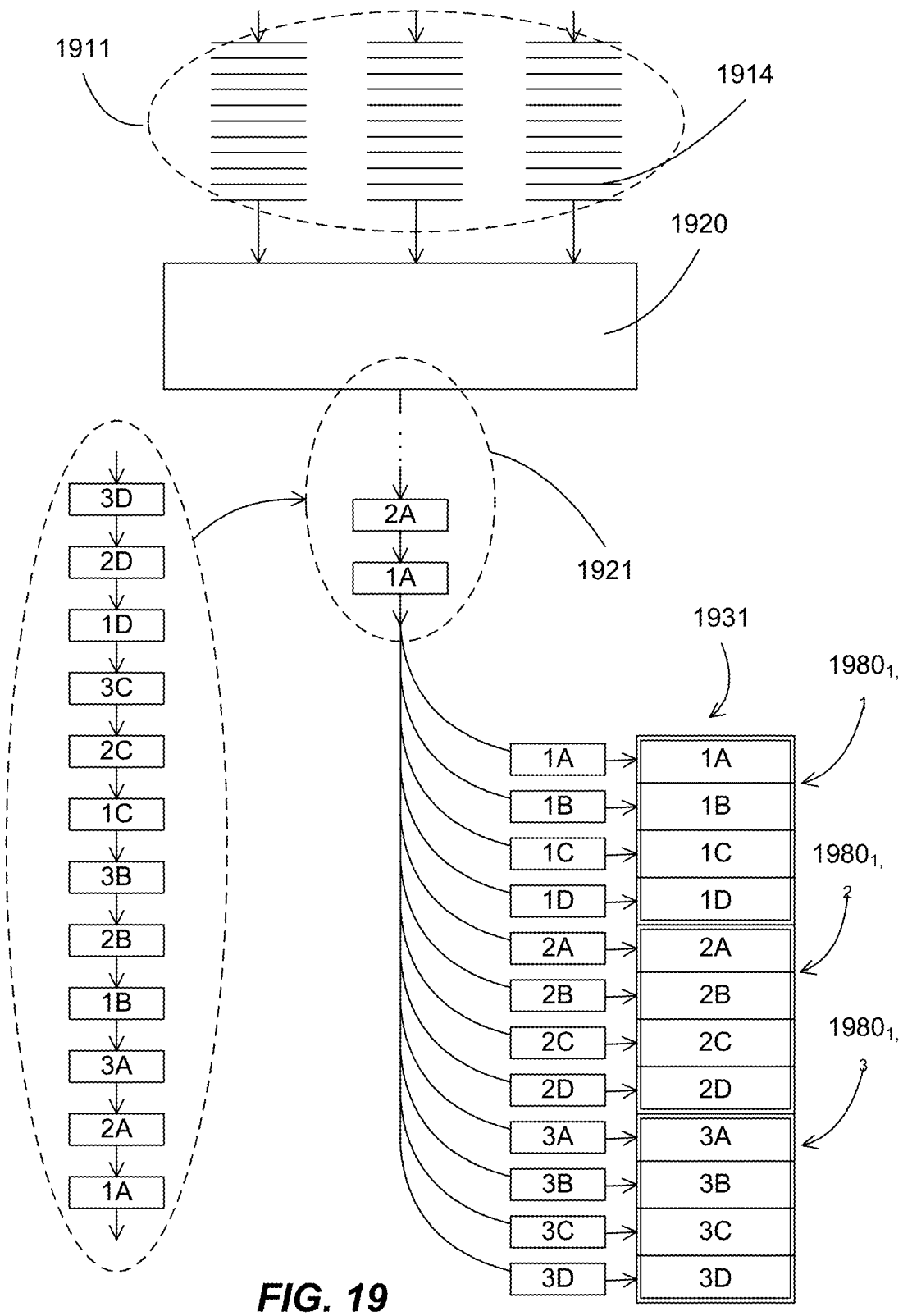
FIG. 19 illustrates a data flow according to some embodiments.

FIG. 19 illustrates a data flow according to some embodiments. A data packet can contain a partial image frame, such as a few lines of image data. For example, for an optical sensor of 4096×3100 pixels, a data packet can have 4 lines of image data, or 4×4096 bytes, with each byte of data containing the intensity of electromagnetic radiation received by one pixel on the imaging sensor. The processing module can include a buffer enough to store a data packet from each parallel stream. Thus, a system having 54 camera units having optical sensors of 4096×3100 pixels, the processing module can store less than 1 Mbytes (54 sensors× 4×4096<1 Mbytes).

In some embodiments, the size of the data packet is chosen to match with a memory structure, such as 1 page of memory. For example, if a page of memory is 4096 bytes, each data packet can have a multiple of page data.

In some embodiments, the processing module 1920 is configured to receive multiple data streams 1911 from the camera units, with each data stream including images captured by a camera unit. The images can be sent bytes by bytes, lines by lines 1914, and then images by images.

The processing module can be configured to form data packets, with each data packet including one or more lines of data from the multiple data streams. For example, some lines of data from a first data stream can be organized to form data packet 1A. Some lines of data from a second data stream can be organized to form data packet 2A. Some lines of data from a third data stream can be organized to form data packet 3A. Subsequent lines from the first data stream can be organized to form data packets 1B, 1C, and 1D. Subsequent lines from the second and third data streams can be organized to form data packets 2B, 2C, 2D, and 3B, 3C, 3D, respectively. Subsequent lines from the first data stream of a next image can be organized to form a next data packet.

Data packets can be sent from a processing module to a memory 1931 of a computation unit in a data packet stream 1921. The data packets can be organized by the processing module to be a data packet from each camera unit, e.g., a first data packet from a first camera unit until a first data packet from the last camera unit. After all first data packets from all camera units are the second data packets from the camera units, until all data packets from the first images, and until all subsequent images.

As shown, the data packet stream 1A, 1B, 1C, and 1D of image $1980_{1,1}$ can be stored contiguously. Similarly, the data packet stream 2A, 2B, 2C, and 2D of image $1980_{1,2}$, and the data packet stream 3A, 3B, 3C, and 3D of image $1980_{1,3}$ can be stored contiguously.

In some embodiments, the processing module is configured to have match bandwidth between incoming data and outgoing data to prevent data bottlenecking. For example, the communication link for the serial data stream 1921 can have equal or greater bandwidth than the combined bandwidths of the multiple data streams 1911. In some embodiments, the number of lanes for the communication link can increase to satisfy the bandwidth requirement.

FIGS. 20A-20B illustrate flow charts for operating a processing module configured for the disclosed data flow according to some embodiments. In FIG. 20A, operation 2000 continuously receives in parallel multiple streams with data in each stream comprising image frames captured from a camera, with each stream including a sequence of rows of data of the image frames. Operation 2010 forms, after receiving one or more rows of data from a parallel stream, a data packet having the one or more rows of data, with the data packet further including information related to a destination for the data packet. Operation 2020 sequentially sends the data packets from the multiple parallel streams to the destinations of the data packets in a round robin scheduling of the data packets in which a data packet of each stream takes turn to be sent.

In FIG. 20B, operation 2040 configures a processing module to receiving in parallel multiple image frame streams, with each stream including a sequence of rows of data of the image frames. Operation 2050 configures the processing module so that after receiving one or more rows of data from a parallel stream. The processing module forms a data packet comprising the one or more rows of data together information related to a destination for the data packet. Operation 2060 configures the processing module for sequentially sending the data packets from the multiple parallel streams to the destinations of the data packets in a round robin scheduling in which a data packet of each of the multiple parallel streams are sent in turn.

Direct Memory Access

FIG. 21A—21C illustrate a memory configuration according to some embodiments. The memory 2131 is organized so that the images are stored contiguously, which can allow ease of writing and reading data. For example, the memory can be structured to store the first images of all n camera units $2180_{1,1}$-$2180_{1,2}$, organized from the first image captured by the first camera unit to the first image captured by the last camera unit. The image storing structure can be repeated for subsequent images, such as for the second images of all n camera units $2180_{2,1}$-$2180_{2,n}$, organized from the second image captured by the first camera unit to the second image captured by the last camera unit.

In some embodiments, the size of the data packets can be determined for an efficient writing to and reading from the memory. For example, each data packet can have the size of one or more pages of memory, with a page of memory being typically 4096 bytes, e.g., having hex address 0-FFF. As shown, a memory can be organized with addresses from 0x0000 to 0x3000 for 4 pages of memory, with the first page having addresses 0x0000-0x0FFFF with the starting address 0x0000, the second page having addresses 0x1000-0x1FFFF with the starting address 0x1000, the third page having addresses 0x2000-0x2FFFF with the starting address 0x2000, and the fourth page having addresses 0x3000-0x3FFFF with the starting address 0x3000. By organizing data packets in memory pages, the starting addresses can have a smaller number of bytes, for example, by ignoring the last 3 bytes.

In some embodiments, after structuring the memory, the starting addresses, or the information allowing the processing module to determine the starting addresses, of the data packets or of the images can be sent to the processing module. The starting addresses can be incorporated in the data packets. The data in the data packets can be parsed, for example, by a parser circuit, to separate the addresses from the data, and to send the data to the parsed addresses. Alternatively, the starting addresses can be stored or calculated, such as storing in a look up table, which can allow an address lookup circuit of the processing module to find the addresses of the data packets.

In some embodiments, image data in multiple data streams from the camera units can be organized by the processing module into data packets, with each data packet containing image data a data stream sent from a camera unit. The data packets can be configured with the size of one or more integer pages of the memory, such as 1, 2, 3, or 4 pages. The processing module thus can wait to receive the proper data amount from each data stream of the camera array before organizing the received image data into data packets. The image data in each data packet can be one or more integer lines of the camera image sensor, can be a partial line, or can be one or more integer lines with a partial line.

For example, for a camera having an image sensor of 4096×3100, a line of the image sensor contains 4096 pixels. With a pixel having 1 byte of data, a line of the image sensor contains 4096 bytes, which can correspond to a page of memory of 4096 bytes. A data packet can contain an integer multiple of lines, such as 1, 2, 3, or 4 lines of data from the image sensor. As shown in FIG. 21A, a data packet 2151A contains 1 line of the image sensor, which is the same size of a page of memory.

A camera can have an image sensor having a lower number of pixels, and the data packet can contain more than 1 line, such as 1 line and a partial line, an integer multiple of lines, or an integer multiple of lines and a partial line. As shown in FIG. 21B, a data packet 2151B contains two lines of the image sensor, for a sensor having 2148 pixels per line, to achieve 2 lines per data packet to fit into a page of memory.

A camera can have an image sensor having a higher number of pixels, and the data packet can contain less than 1 line, such as a partial line. The remaining portion of the line can be contained in a subsequent data packet. As shown in FIG. 21C, a data packet 2151C contains a portion of a line of the image sensor, for a sensor having more than 4096 pixels per line. The remaining portion of the line is stored in a next data packet, together with a portion of the next line.

Figure 22A:
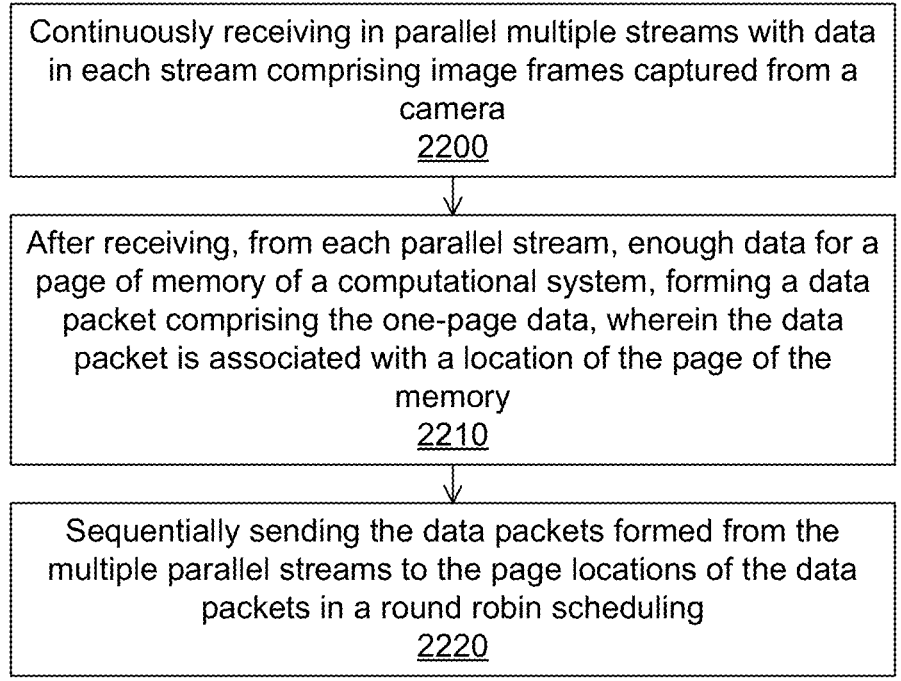
FIGS. 22A-22B illustrate flow charts for a data transfer process to a memory according to some embodiments.
Figure 22B:
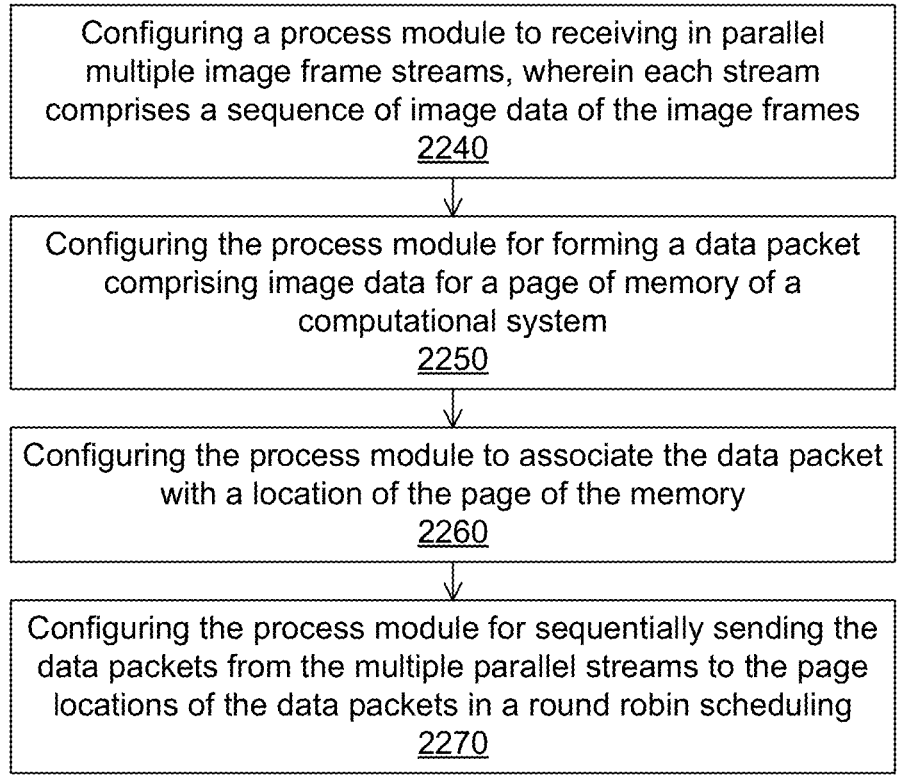

FIGS. 22A-22B illustrate flow charts for a data transfer process to a memory according to some embodiments. In FIG. 22A, operation 2200 continuously receives, in parallel, multiple streams with data in each stream including image frames captured from a camera unit. Each stream can include a sequence of pixel data of the image frames, organized in rows and in frames. For example, pixel data of a first line of a first image is sent first, followed by pixel data of next lines of the first image, until pixel data of the last line of the first image. The sequence of pixel data can continue with the next images, such as with the second image captured by the camera unit. There can be a pause between images, for example, depending on the architecture of the camera units, e.g., having enough buffer data to store captured images, or how fast the image data can be transferred out compared to how fast the images can be acquired.

Operation 2210 forms, after receiving from each parallel stream enough data for one or more pages of memory of a computational system, a data packet having the one-or-more-page data. The data in each packet can include one or more integer multiple of a line of an image sensor, or fractions of a line. The data packet can be associated with a starting location of the page of the memory so that the data packet can be stored in the memory, starting at the starting location.

Operation 2220 sequentially sends the data packets formed from the multiple parallel streams to the page locations of the data packets in a round robin scheduling. Data packets can be formed from multiple data streams at a same time, with small variation in timing between the data streams. The data packets from the multiple data streams can be sent one at a time, in a serial data stream. For example, after a first set of multiple data packets are formed from the multiple data streams, the data packet from a first data stream can be sent, followed by the data packet from a second data stream, until the data packet from the last data stream.

During the serial sending process of the first set of data packets, the second set of multiple data packets from the multiple data streams can be accumulated and formed. After the first set of data packets are sent, the second set of data packets can start to be sent.

In FIG. 22B, operation 2240 configures a processing module to receiving in parallel multiple image frame streams, with each stream including a sequence of image data of the image frames, such as a sequence of bytes of pixels of the image frames. Operation 2250 configures the processing module for forming a data packet having partial image frames of the image data for one or more pages of memory of a computational system. Operation 2260 configures the processing module to associate the data packet with a location of the memory, such as the starting location of a page of memory where the data packet can be stored. The starting location can be the starting address of a page, which can be more efficient in the data writing process to the memory. Operation 2270 configures the processing module for sequentially sending the data packets from the multiple parallel streams to the page locations of the data packets in a round robin scheduling.

FIGS. 23A-23D illustrate a data flow for storing data packets to a memory according to some embodiments. Data packets can be sent from a processing module to a memory 2331 of a computation unit in a data packet stream 2321. The data packets can be organized by the processing module to be a data packet from each camera unit, e.g., a first data packet from a first camera unit until a first data packet from the last camera unit. After all first data packets from all camera units are the second data packets from the camera units, until all data packets from the first images, and until all subsequent images.

As shown in FIG. 23A, the data packet stream can show data packets 1A and 2A of first partial image frames of first and second camera units, respectively. The data packet 1A can be sent to the first portion of memory reserved for image $2380_{1,1}$. The location of the memory portion can be obtained from the data packet or by an algorithm or process performed by the processing module.

As shown in FIG. 23B, the data packet stream can now show data packets 2A and 3A of first partial image frames of second and third camera units, respectively, after the first partial image frame 1A of the first camera unit has been stored in memory. The data packet 2A can be sent to the first portion of memory reserved for image $2380_{1,2}$.

The process can continue until the data packet of the last camera unit. For example, as shown in FIG. 23C, the data packet stream can now show data packets 3A and 1B of first and second partial image frames of third and first camera units, respectively. As shown, the data packet 3A can be from the last camera unit, e.g., there are 3 camera units in the system. The data packet 3A can be sent to the first portion of memory reserved for image $2380_{1,3}$.

The process can continue for the next data packets in the data packet stream 2321. For example, as shown in FIG. 23D, the data packet stream can now show data packets 1B and 2B of second partial image frames of first and second camera units, respectively. The data packet 1B can be sent to the second portion of memory reserved for image $2380_{1,1}$.

FIGS. 24A-24D illustrate flow charts for writing to memory according to some embodiments. In FIG. 24A, operation 2400 writes a data packet to a memory location, with the memory location obtained from the data packet. The memory location can be the starting address of the memory area in which the data packet can be stored. The memory location can be information related to the starting address of the memory area. For example, a processing module can obtain the memory addresses from a computational unit, and can incorporate the memory addresses to the data packets during the organization of the data packets from the multiple data streams from the camera units. In the process of writing the data packets to the memory, the memory addresses can be extracted from the data packets, and the data from the data packets can be written to the memory addresses.

In FIG. 24B, operation 2410 obtains a memory location for each data packet in a serial data packet stream. The memory location can be incorporated in the data packet, for example, during the formation of the data packet. The memory location can be obtained independently, for example, by a look up table. Operation 2420 directly writes the data packet to the memory location. Knowing the memory location, the data packet can be written directly to the memory location, e.g., without passing through a processor of the computational unit. The processing module can be configured to perform the direct memory writing, such as by obtaining direct memory access from the computational unit. The direct memory access can significantly improve the speed of the data transfer process, e.g., reduce the delay times between the acquisition of images by the camera array and analysis of the computational unit.

In FIG. 24C, operation 2440 configures a processing module to extract a memory location of a computational system from a data packet. The processing module can be configured to incorporate the memory location to the data packet in the formation and organization of the data packet before. Operation 2450 configures the processing module to write the data packet to the memory location.

In FIG. 24D, operation 2470 configures a processing module to obtain data packets from a stream of data packets, with each data packet including a partial image frame fitting for a page of memory of a computational system. Operation 2480 configures a processing module to directly write each data packet to a memory location of a computational system, with the memory location obtained through the data packet.

Image processing based on partial image frames In some embodiments, the computational unit of a system, such as a microscope system, can be configured to process partial data, such as partial image frames received from a camera array. The data flow from the camera array can be configured to include data packets, with each data packet containing a partial mage frame. Thus, after receiving one or more data packets, the computational unit can construct and analyze one or more partial image frames, which can allow the computational unit to respond, based on the analysis of the partial image frames. The responses based on the partial image frames can occur much quicker, as compared to responses based on full image frames. For example, for optical sensors having 4096×3100 pixel arrays, a data packet can include a partial image frame of 4 lines of 4096 pixels. The computational unit configured to respond after a partial image frame of 4 lines can respond in a fraction of the time it takes to receive the whole image frame, such as 3100/4=775 times longer to receive the full image frame of 3100 lines, as compared to receiving a data packet of 4 lines.

Figure 25:
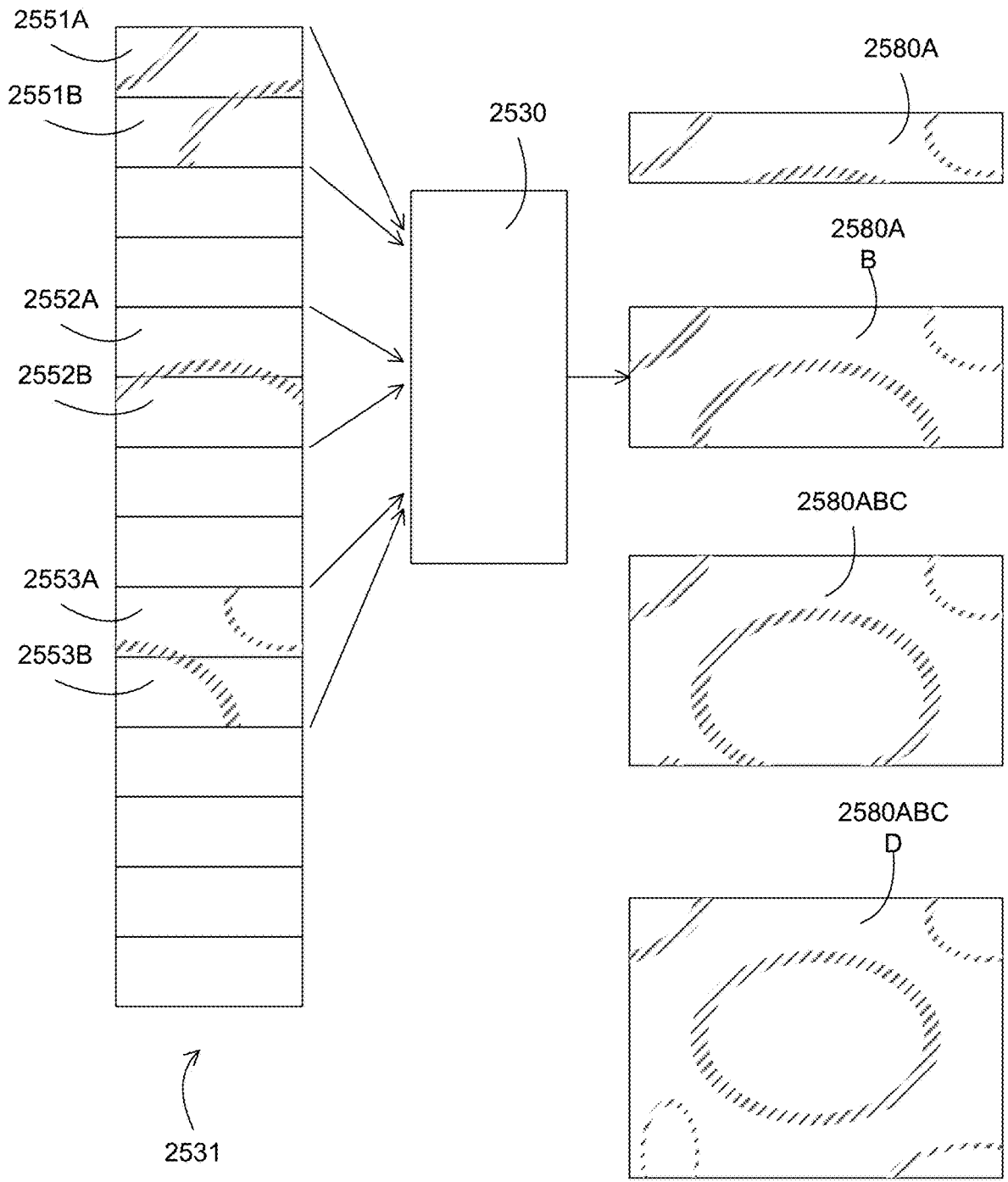
FIG. 25 illustrates a configuration of a computational unit according to some embodiments.

FIG. 25 illustrates a configuration of a computational unit according to some embodiments. A computation unit can include a processor 2530 coupled to a memory 2531, such as fast accessed RAM (random access memory). The memory 2531 can be connected directly with a processing module, which can transfer data directly to the memory 2531 without passing through the processor 2530. The processing module can send image data in the forms of data packets, e.g., each data packet containing a partial image frame of the image frames captured by the camera units. For example, a first partial frame 2551A of a first image captured by a first camera unit can be sent and stored first in the memory 2531. First partial frames 2552A and 2553A of first images captured by other camera units can be sent and stored after the first partial frame 2551A. After the first partial image frames 2551A, 2552A and 2553A, second partial image frames 2551B, 2552B and 2553B can be sent and stored in the memory. The partial image frames can be sent and stored until the whole first image frames captured by all camera units are sent and stored. In some embodiments, the memory can be large enough to store multiple images from the camera array, e.g., for n×m images with m images per camera unit and n camera units in the camera array.

The processor 2530 can be configured to analyze the data in the memory, even for partial image frames. For example, the processor can be configured to analyze one partial image frame 2551A, which is a first partial image frame of a first image frame captured by a first camera unit. The processor can be configured to analyze the partial image frames 2551A, 2552A and 2553A, which are the first partial image frames of the first image frames captured by all camera units. After analyzing the partial images frames captured by all camera units, the processor can construct an image construction 2580A of a portion of the sample. The image construction 2580A can allow the processor to have knowledge of the image acquisition, and can issue new instruction, for example, to the camera units via the processing module to change the acquisition parameters.

In some embodiments, the processor can analyze multiple partial image frames to construct image constructions of more than one portion of the image, such as image construction 2580AB constructed from partial image frames 2551A, 2552A, 2553A, 2551B, 2552B and 2553B, and image constructions 2580ABC, and 2580ABCD.

FIGS. 26A-26C illustrate flow charts for constructing partial representation of sample images according to some embodiments. In FIG. 26A, operation 2600 constructs a composite partial image frame from multiple partial image frames, with the partial image frame obtained from a memory area in which a complete image frame for the partial image frame is configured to be stored.

In FIG. 26B, operation 2620 obtains multiple partial image frames from different non-contiguous memory areas, with one or more partial image frames obtained from each memory area. A complete image frame is stored in each contiguous memory area. Operation 2630 constructs a composite image frame from the multiple partial image frames.

In FIG. 26C, operation 2650 configures a computational system to obtain multiple partial image frames to construct a composite image frame, with the multiple partial image frames stored in different non-contiguous memory areas, and with one or more partial image frames of the multiple partial image frames obtained from each contiguous memory area. A complete image frame is stored in the contiguous memory area.

Figure 27:
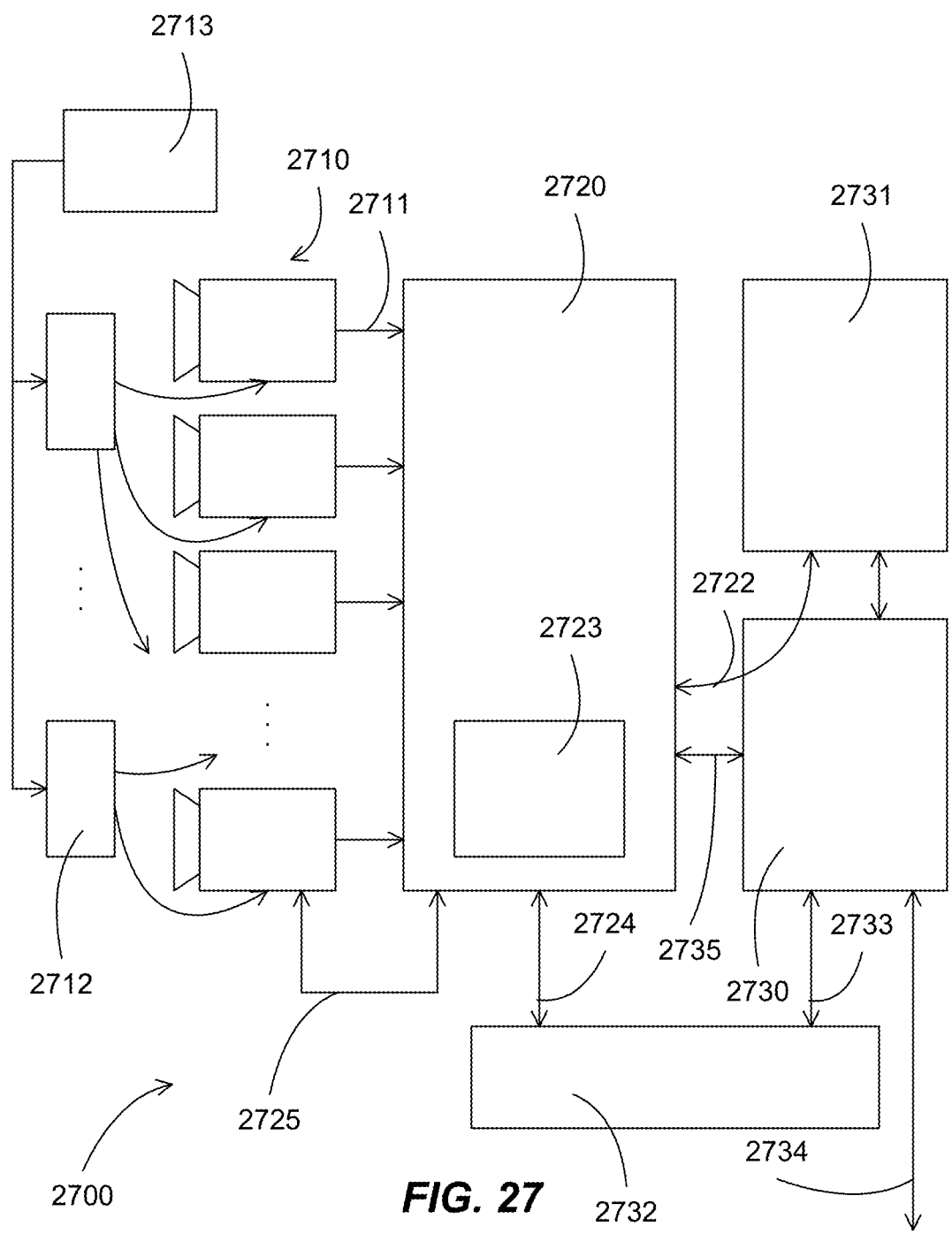
FIG. 27 illustrates a microscope system configured with a data transfer process according to some embodiments.

FIG. 27 illustrates a microscope system configured with a data transfer process according to some embodiments. A microscope system 2700 can include a camera array 2710, which includes multiple camera units. A clock generator 2713 can be used to generate a common clock signal, such as a 25 MHz clock signal, to all camera units, for example, through clock buffers 2712. A processing module 2720, such as an FPGA based module (e.g., a module containing a processing chipset, such as an FPGA, or other chipset of an ASIC, an ASSP, or a SOC), can be configured to receive image data from the multiple camera units, e.g., through data streams 2711, which use a high speed serial communication link for each camera unit. The FPGA based module 2720 can include a shallow buffer 2723, for example, to store incoming data from the data streams 2711. The FPGA based module can be configured to send 2725 sensor configuration data to the camera array, for example, to provide image parameters to the image sensors of the camera units. The sensor configuration can be received from a computational unit having a processor 2730 and a memory 2731. For example, the processor can send configuration and settings to the FPGA based module, with the configuration and settings including setting information for the FPGA based module and the configurations for the image sensors. The FPGA based module can communicate 2722 with the computational unit using direct memory access (DMA) to pass data directly to the memory 2731, through a high speed link such as PCIe. The FPGA based module can communicate 2724 with a module 2732, which can be configured to control lighting, motion, and sample handling for the microscope system. The computational unit 2730 can also communicate directly 2733 to the module 2732. The computational unit 2730 can communicate 2734 with a storage or network devices. The system can include peripheral devices, such as stages, illumination units, or other equipment involved in the apparatus necessary to ensure adequate imaging conditions.

The microscope system 2700 can be configured to minimize the delay in analyzing the data captured by a multi-sensor array 2710 in the microscope, such as from the time an operator defines the microscope's dynamic settings to the time the acquired images are analyzed. The microscope is configured to capture multiple images simultaneously from multiple image sensors, and thus can generate gigabytes of image data per second, with each snapshot containing a few hundred megabytes of data. With minimum delay time in the data transfer process, a computational unit having a processor in the microscope system can rapidly take actions based on the received data from the multiple image sensors, such as to adjust global and local imaging parameters to enhance the image acquisition strategy.

In some embodiments, the microscope system with minimum data transfer delay can be constructed through a combined design of electronic hardware, firmware and analysis software on the processor of the microscope system. For example, multiple image sensors can be placed on a single printed circuit board, and share a common clock 2713 that is used to provide the multiple image sensors with common clock buffers 2712, a common frame rate and imaging parameters. The data from the image sensors can be send in multiple parallel data streams to a processing module 2720, such as an FPGA, ASIC, ASSP, or SOC based module for data aggregation and preparation before sending to a memory 2731 associated with the processor 2730 of the microscope system for data analysis. The FPGA based module can also be configured to perform direct writing 2722 to the memory without using processing time from the processor, which can ensure that the image data acquired from the multiple image sensors is not lost while the CPU is busy analyzing data and cannot receive data from the sensors. Furthermore, the FPGA based module can enable the processor to be connected to many image sensors without the need for a custom processor design, since processor I/O are often designed for specific very high speed communication standards, while image sensors may require completely different communication protocols.

In some embodiments, the data flow is configured in adequate packet sizes, which are designed to be efficiently transferred to a computational unit. Further, for the stored data to be efficiently utilized by the processor, such as a central processing unit (CPU), or other computational unit such as a graphical processing unit (GPU), data for each image must be stored in contiguous memory on the memory associated with the processor.

In some embodiments, the multiple data streams from the camera units are organized in a serial data packet stream to send to the memory of the computational unit, for example, by an FPGA based module. It is an innovative feature of the data flow architecture that the incoming data stream to the memory of the computational unit contains a sequence of data packets in the size of a partial image frame, e.g., a small portion of a full image frame data, such as a data packet size is 0.01% to 1%, 0.05% to 0.5%, 0.02% to 0.4%, or 0.1% to 0.2% of a full image. For example, an image sensor can have a 4096×3100 pixel size, with a pixel data containing in a byte of data. A data packet size can be chosen to include one line of the pixel size, e.g., 4096 bytes, for $1/3100$ times smaller than a full image data. A data packet size can be chosen to include two lines of the pixel size, e.g., 2×4096 bytes, for $1/1550$ times smaller than a full image data. A data packet size can be chosen to include four lines of the pixel size, e.g., 4×4096 bytes, for $1/775$ times smaller than a full image data.

In the small data packet architecture, e.g., the size of a data packet is less than 0.5% of a full image size, the FPGA based module configured to reorganize the multiple incoming data streams from the multiple camera units into a data packet stream can only need to store one or two data packets from each data stream of the camera unit, such as a few multiples of 4096 bytes of data, for image sensors having a 4096×3100 pixel size.

The small data packets can be critical in the flow of data from multiple parallel data streams from multiple camera units to the memory of the computational unit. The FPGA based module can configured and organize the image data into small partial image frames, e.g., data packets, and transfer the partial image frames to the memory so that the partial image frames are available to the processor. With the processor configured to process and analyze the partial image frames, instead of waiting for full image frame data, the responses from the processor can be thousands of times faster, since the partial image frames can be thousands of times smaller, and thus can arrive thousands of times faster.

An advantage of the data flow architecture using small data packets is that image data, actually data for partial image frames, can be available for the processor to analyze with minimum delays after the images are acquired by the camera units. With the partial image frames thousands of times smaller than full image frames, the image flow from the image sensors to the processor can also be thousands of times faster. The fast data flow can enable the processor to start analyzing the image data, e.g., the first portion of the images, before the full images have completed the transfer process, and thus can allow the processor to change the image parameters of the image sensors before the acquisition of next images.

Also the ability to start analyzing images, e.g., partial image frames, immediately as the image being captured and data coming out of the image sensors can avoid the dead time between image acquisition, processing and imaging parameter selection. For example, changing the illumination, sample position, or other environmental parameters can often be a slow process and ensuring that the new imaging parameters are quickly identified is an important factor to reducing the total imaging time of an experiment.

In addition, the fast data flow which allow the availability of image data, e.g., partial image frames, with minimal delays after the images, e.g., full image frames, being captured can be critical for many applications in microscopy where decisions must be made depending on the observed measurements from a sample, such as in biological applications with stimuli applied to a model organism to understand the behavior of the organism under different scenarios. The fast data flow process can allow the processor to quickly change 2725 the observed parameters, e.g., the imaging parameters of the sensors or accompanying hardware, such as the illumination, sample stage, sample temperature, etc., to best observe the organism behavior.

In some embodiments, after an image acquisition is triggered 2724, either by continuous acquisition, or an event of interest, data from each image sensor begins to arrive continuously in time, from all image sensors at the same time. To avoid lengthy delays, the receiving module, e.g., the FPGA based module, can create small data packets that can be efficiently transmitted to the memory. Various different packet sizes are suitable, but a packet size of 4096 bytes (0x1000 in hexadecimal representation) is particularly interesting since it aligns well with a page of memory on the computational unit. For image sensors with a row size of 4096 pixels, when the image is transmitted with 8 bits per pixel, this one page of memory on a computer corresponds to one row of data from an image sensor. For image sensors with different sizes, 4096 bytes can correspond to partial rows of data from the image sensor, or multiple rows of a sensor. A key design parameter is that the FPGA can gather multiple such packets simultaneously from the different image sensors. After receiving enough data in each of the different image sensors, the data packets can be reordered in time, in a round-robin fashion, so that they are transmitted one after the other to a high speed communication output link 2722 to the memory. Data packets in the high speed communication link can be sent to the appropriate location in the computer memory where it can then be analyzed, stored, or forwarded 2734 to another computer, by the end user application.

In some embodiments, the data flow of a sequence of data packets each containing a partial image frame can be formed by an FPGA based module having a small data buffer 2723. For example, the FPGA based module can store a small partial image frame, such as multiples of a line of data n an image sensor, from each image sensor. The partial image frame data flow can lower the cost of the FPGA based module, by requiring small buffer size FPGA based module. For example, in a system having 54 image sensors of 4096×3100 pixel size, with each pixel stored in a byte of data, full image frames for the 54 image sensors can require almost 700 Mbytes of data for a buffer in a FPGA based module. Using the partial image frame data flow, with each partial image frame having 4 lines of image data, the partial image frames for 54 image sensors can require less than 1 Mbytes, which can be easily achievable, as compared to the 700 Mbytes requirement. Further, 700 Mbytes of buffer space requires dedicated hardware to ensure this large buffer space, increasing the size, cost, and complexity of the hardware design.

In some embodiments, the data flow can accommodate a large number of image sensors, e.g., a large number of parallel data streams from a camera array, based on the small size of the partial images. As discussed above, a one-Mbyte FPGA based module can accommodate 54 image sensors. FPGA based modules with higher buffer sizes, such as multiples of 1 Mbyte sizes, can accommodate multiples of 54 image sensors.

In some embodiments, the FPGA based module is configured to receive data from multiple data streams from multiple camera units, and then reorganize the received data on the fly, to generate an output stream of data packets to be sent to appropriate locations in the memory associated with the processor. To minimizing delays, the FPGA based module can send the data packets directly to the memory locations, bypassing the need for any involvement of the processor. The direct memory writing can be accomplished by a direct memory access feature on the computational unit, with the FPGA based module using a communication link that support direct memory access (DMA) together with having an appropriate DMA engine capable of writing the data packets to the appropriate locations on the memory.

Further, the FPGA based module also needs to know the memory locations to send the data packets. Thus, during the system set up phase, the processor can send 2735 descriptors of the locations of the memory, e.g., the RAM associated with the processor, to the FPGA based module. The processor can send 2733 set up information to a configuration and setting module 2732, with the FPGA based module responsible for trigger and synchronization 2724. For example, once the imaging parameters are defined, such as frame rate, image size, triggering conditions, number of cameras used, exposure time, digital gain, analog gain, and number of frames to be acquired, the processor can provide the memory addresses where each image must be stored. The location of these addresses is designed such that each image will be located contiguously in the memory to ensure efficient computation and subsequent analysis. The FPGA based module and the computational unit can be configured to allow the FPGA based module to send data packets to the memory of the computational unit without requiring any additional memory copies from the computational unit.

In some embodiments, the location descriptors, such as the starting addresses or links to the starting addresses, of the memory can be incorporated in the data packets, so that each data packet can be sent to the appropriate memory locations. The FPGA based module can communicate with the computational unit through an interface that supports direct memory access, which can require hardware support from the computational unit, and can require a link that support direct memory access, such as PCIe or similar interfaces. The direct memory access feature can enable the FPGA based module to control the destination of the large quantities of data packets that are transmitted to the memory of the computational unit.

After organize the data packets from the multiple parallel incoming data streams from the camera array, the FPGA based module can communicate directly with the memory, freeing the processor for other tasks such as processing or analyzing image data. Direct memory access can avoid multiple copies of the data formed between the operating system kernel, which can limit control to the external hardware and the end user application that lives in an isolated environment outside of kernel memory. The direct memory access can prevent loss of data, due to an efficient and predictable memory writing process. With direct memory access, the FPGA based module can ensure that data packets containing partial image frames of the images captured by the camera units can arrive at their respective locations in the memory. For optimal computation speed, the memory can reserve a series of addresses that contain the starting locations of the N*M buffers (where N is the number of image sensors and M is the number of images to capture per sensor), each large enough to store a single image. In addition, for efficient direct memory access, the data packet size is optimized to the operating system boundaries, such as integer multiples of 4096 bytes.

In some embodiments, the FPGA based module can be configured to have match bandwidths between the outgoing data packet stream to the memory and the multiple incoming streams from the camera units. For example, the data output interface, which is the communication link between the FPGA based module and computational unit, can match with or have greater than, in terms of aggregate data throughput, the data input interfaces, which are the communication links between the FPGA based module and multiple camera units. The communication links and the number of lanes for the communication links can be selected to make sure that there is no data bottlenecking in transferring data packets to the memory.

Benefits of the data flow architecture and the microscope systems incorporating the data flow architecture, can include a new ability to rapidly record high-resolution microscopy imagery over a very large field of view using a multitude of micro-cameras while minimizing the memory requirements on the data gathering FPGA based module. This new capability opens up new directions for scientific discovery—allowing for image snapshots or videos of large area that may contain a variety of samples including but not exclusive to freely moving organisms over more than just several square centimeters while simultaneously changing their stimuli or imaging environment. It also provides a more efficient manner to obtain large data volumes from large, flat objects (e.g., semiconductor wafers, sheets of glass, plastic components) while their imaging environment is adapted to the recorded images or partial images.

FIGS. 28A-28C illustrate flow charts for forming microscope systems according to some embodiments. In FIG. 28A, operation 2800 forms a computational multi-camera system. The computational multi-camera system can include a single clock source for the multiple cameras, a processing module with direct memory access to memory of the computational module, and a speed matching of links between the multiple cameras and the processing module and a link between the processing module and the memory.

In FIG. 28B, operation 2820 forms a computational multi-camera system. The computational multi-camera system can include a processing module configured to continuously sending data packets to memory of the computational module while being receiving data from the multiple cameras. Each camera can be configured to continuously send data to the processing module. The data can include sequential lines of image frames captured by each camera. The data packets can include a group of the lines configured to match a page of the memory. The processing module can be configured to send the data packets directly to the memory without using a processor of the computational system.

In FIG. 28C, operation 2840 forms a computational multi-camera system with a processing module between the multiple cameras and the computational system, with the computational system configured to instruct the multiple cameras for parameters for next image frames based on a composite partial image frame constructed from received partial image frames.

FIGS. 29A-29B illustrate flow charts for operating a microscope system according to some embodiments. In FIG. 29A, operation 2900 generates a serial data stream to a memory of a computational system. The serial data stream can include round robin partial image frames of image frames from cameras in a camera array. The partial image frames can be received as parallel data streams from the cameras. The bandwidth of the serial data stream can be equal or greater the sum of the bandwidths of the parallel data streams through hardware connections. The serial data stream can be written directly to the memory without through a processor of the computational system to match the throughput of the serial data stream.

In FIG. 29B, operation 2920 continuously receives in parallel multiple streams, with each stream having sequences of portions of image frames captured from a camera of multiple cameras. The multiple camera units can share a common clock to reduce timing variations of the received portions. Operation 2930 waits for receiving enough portions from the multiple parallel streams to form a data packet for each stream, wherein the data packet matches in size with a page of memory of a computational system. Operation 2940 sequentially sends the data packets formed from the multiple parallel streams to the memory using direct memory access to improve throughput.

Figure 30:
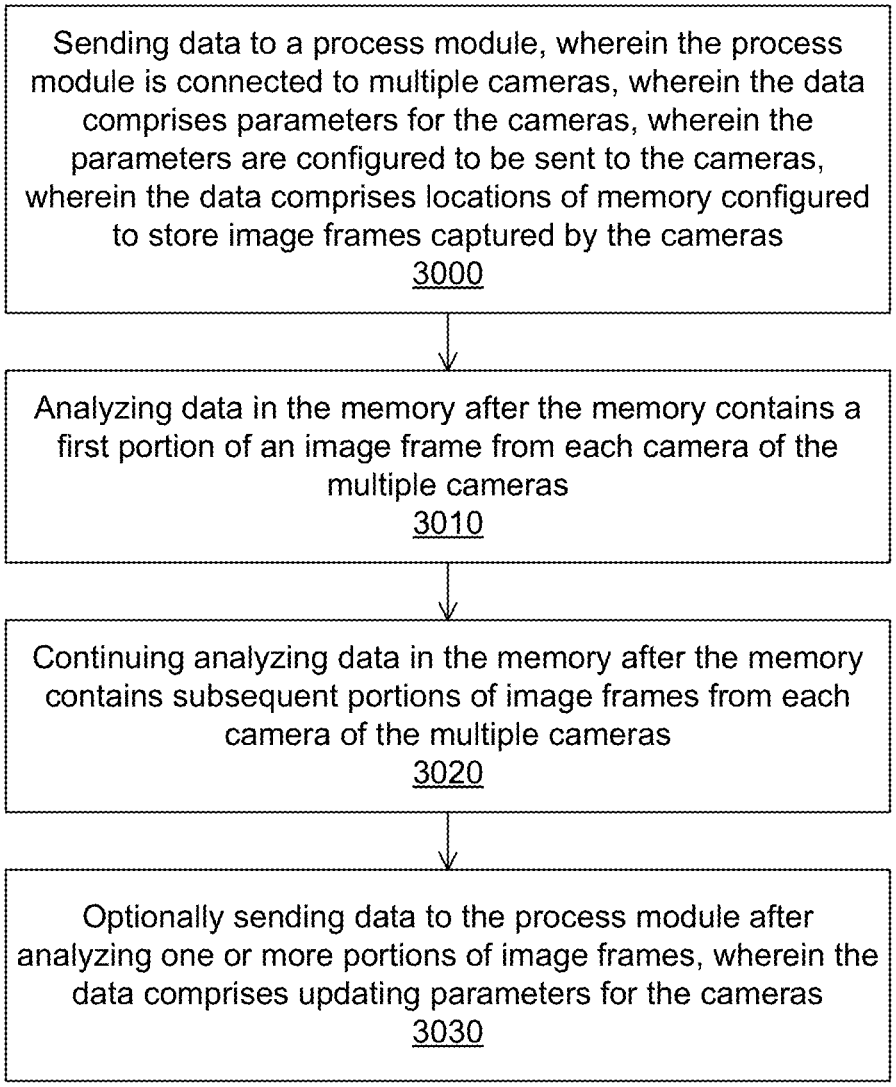
FIG. 30 illustrates a flow chart for operating a microscope system according to some embodiments.

FIG. 30 illustrates a flow chart for operating a microscope system according to some embodiments. In FIG. 30, operation 3000 sends data to a processing module, with the processing module connected to multiple cameras, and the data including parameters for the cameras. The parameters are configured to be sent to the cameras, with the data including locations of memory configured to store image frames captured by the cameras. Operation 3010 analyzes data in the memory after the memory contains a first portion of an image frame from each camera of the multiple cameras. Operation 3020 continuing analyzes data in the memory after the memory contains subsequent portions of image frames from each camera of the multiple cameras. Operation 3030 optionally sends data to the processing module after analyzing one or more portions of image frames, wherein the data comprises updating parameters for the cameras.

FIG. 31 illustrates a flow chart for operating a microscope system according to some embodiments. In FIG. 31, operation 3100 provides a processing module with direct memory access to the memory. Operation 3110 sends data to a processing module, with the data including parameters to be sent to multiple cameras. The cameras are configured to be operated with a common clock to reduce timing variations between multiple parallel data streams containing captured image frames by the multiple cameras when received by the processing module, wherein each parallel data stream comprises sequences of lines of the image frames captured by a camera. The data can include locations of memory configured to store image frames captured by the cameras Operation 3120 analyzes data in the memory after the memory contains one or more data portion of an image frame from each camera of the multiple cameras. The one or more data portion can include one or more lines or a fraction of a line of the image frame. The one or more data portion can have a size of a page of the memory. The one or more data portion can be reorganized by the processing module after receiving data from a parallel data stream equal or more than the page of memory. The one or more data portion can be sent by the processing module to the memory at a memory location of the memory locations received by the processing module. The one or more data portion can be sent by direct memory access. The processing module can be configured to have matched bandwidths between the multiple parallel data streams and a serial stream comprising the one or more data portions and subsequent one or more data portions of the image frames of the multiple cameras.

Figure 32:
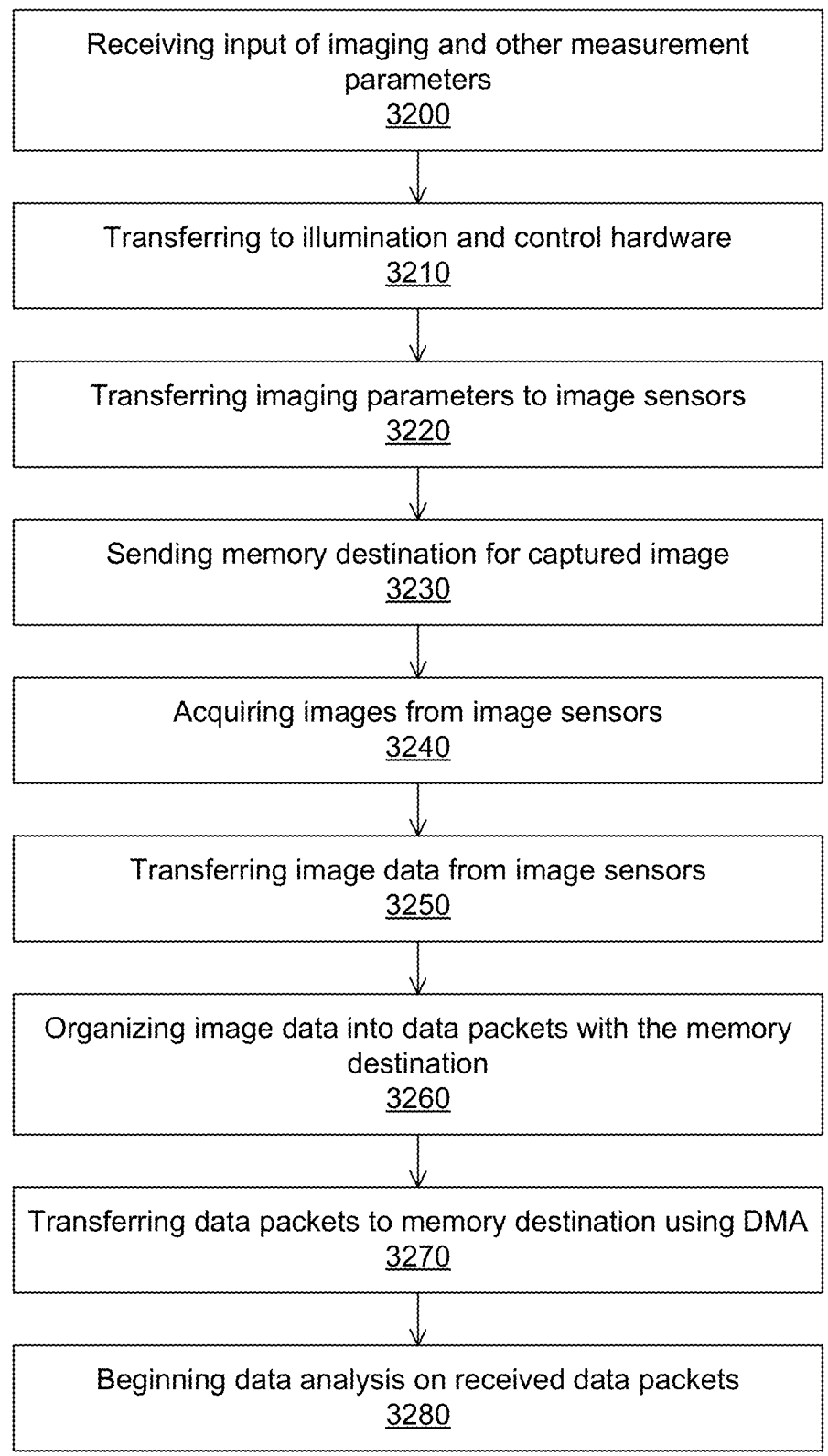
FIG. 32 illustrates a flow chart for operating a microscope system according to some embodiments.

FIG. 32 illustrates a flow chart for operating a microscope system according to some embodiments. In FIG. 32, operation 3200 receives input of imaging and other measurement parameters from a user. Operation 3210 transfers portions of the input to illumination and control hardware. The imaging parameters can be obtained from the end user and then transmit them to the array of sensors and peripheral devices. Peripheral devices may include stages, illumination units, or other equipment involved in the apparatus necessary to ensure adequate imaging conditions.

Operation 3220 transfers imaging parameters in the input to image sensors. Operation 3230 sends memory destination for captured image. Operation 3240 acquires images from image sensors. Once the imaging parameters are defined, for example, frame rate, image size, triggering conditions, number of cameras used, exposure time, digital gain, analog gain, and number of frames to be acquired, a computer can provide the memory addresses where each image must be stored. The location of these addresses is designed such that each image will be located contiguously in the computer's RAM so as to ensure efficient computation and subsequent analysis. The set up can ensure that the image data can be sent to its final destination without requiring any additional memory copies from the computer processor.

Operation 3250 transfers image data from image sensors. Operation 3260 organizes image data into data packets with the memory destination. After an image acquisition is triggered, either by continuous acquisition, or an event of interest, data from each image sensor begins to arrive continuously in time, from all sensors at the same time. To avoid lengthy delays, an organizing module can create small packets of data, which can efficiently be transmitted to the computer. The packet sizes can be configured to be of suitable size, such as a packet size of 4096 bytes (0x1000 in hexadecimal representation) since it aligns well with a page of memory on the computer. For image sensors with a row size of 4096 pixels, when the image is transmitted with 8 bits per pixel, this one page of memory on a computer corresponds to one row of data from an image sensor. For image sensors with different sizes, 4096 bytes can correspond to partial rows of data from the image sensor, or multiple rows of a sensor. The organizing module can gather multiple such packets simultaneously from the N different sensors, for example, each packet buffer from the N distinct sensors would have received at least 4096 bytes. These packets are then reordered in time, in a round-robin fashion, so that they are transmitted one after the other to a high speed communication link on the organizing module. At this stage, the organizing module can then transfer the data to the appropriate location in the computer memory where it can then be analyzed, stored, or forwarded to another computer, by the end user application.

Operation 3270 transfers data packets to memory destination using DMA. During the setup phase, the computer can provide descriptors of the location in RAM where the information should ultimately be stored by the organizing module. The organizing module can communicate with the computer through an interface that supports direct memory access. Such interface requires hardware support from the computer, and requires a link that support direct memory access. This enables the organizing module to control the destination of the large quantities of data that are transmitted to the end-user application. Without direct memory access, multiple copies of the data will have to be formed between the operating system kernel, which limits control to the external hardware and the end user application that lives in an isolated environment outside of kernel memory. This process is wasteful, time-consuming, but most importantly, difficult to predict in terms of timing, which may cause the precious loss of data. With direct memory access, the organizing module must ensure that packets originating from distinct cameras arrive at their respective locations in computer memory. Operation 3280 begins data analysis on received data packets, and can optionally provide responses or feedback based on the analysis.

While this invention has been particularly shown and described with references to example embodiments thereof, it will be understood by those skilled in the art that various changes in form and details may be made therein without departing from the scope of the invention encompassed by the appended claims.

What is claimed is:
1. A method comprising
    continuously receiving, in parallel, multiple data streams from multiple cameras,
        wherein each data stream of the multiple parallel data streams comprises a sequence of image data for one or more image frames captured by a camera of the multiple cameras;
    forming a stream of data packets,
        wherein each data packet comprises a portion of an image frame of the one or more image frames,
        wherein each data packet is associated with information relating to a location of a memory of a computational system,
        wherein the stream of data packets comprises data packets from the multiple parallel data streams arranged in a cyclic scheduling in which each data stream contributes a data packet to the stream of data packets;
    sending the stream of data packets to the memory,
        wherein each data packet is stored in the associated memory location of the data packet,
        wherein the memory is configured for the computational system to perform an analysis on the stored data packets,
        wherein the computational system is configured to provide an instruction to the multiple cameras based on the analysis; and
    receiving the instruction to the multiple cameras from the computational system, wherein the instruction comprises updating image acquisition parameters configured to be sent to the multiple cameras,
    wherein the image acquisition parameters comprise illumination, sample position, focus, based the analysis of the data packets stored in the memory.
2. A method as in claim 1, further comprising
receiving a command from the computational system, wherein the command comprises the information relating to the entire locations of the memory to store the data packets.
3. A method as in claim 1,
wherein the portion of an image frame comprises one or more lines of data of the image frame, or
wherein the portion of an image frame is configured to fit completely into one or more pages of the memory.
4. A method as in claim 1, further comprising
clocking the multiple cameras with a common clock to reduce timing variations of the partial image frames between the multiple parallel data streams.
5. A method as in claim 1,
wherein the cyclic scheduling comprises a round robin scheduling.
6. A method as in claim 1,
wherein the bandwidth of the stream of data packets is configured to be greater than or equal to the sum of the bandwidths of the multiple parallel data streams.
7. A method as in claim 1,
wherein the stream of data packets is configured to be sent to the memory by direct memory access.
8. A method as in claim 1,
wherein the computational system is configured to start performing the analysis on the data packets stored in the memory while subsequent data packets on same image frames are being acquired or transmitted.
9. A method comprising
sending first instructions, by a computational system to a processing module,
    wherein the first instructions comprises parameters for multiple cameras,
    wherein the parameters are configured to be sent to the multiple cameras by the processing module,
    wherein the multiple cameras are configured to send multiple parallel data streams comprising image data for multiple image frames captured by the multiple cameras to the processing module,
    wherein each parallel data stream comprises a sequence of image data for one or more image frames captured by a camera of the multiple cameras;
analyzing data in a memory of the computational system after the memory contains one or more data packets sent by the processing module, wherein each data packet of the one or more data packets comprises a portion of an image frame reorganized by the processing module; and sending second instructions to the processing module after analyzing the one or more data packets, wherein the second instructions comprises updating the parameters for the multiple cameras, wherein the updating parameters are configured to be sent to the multiple cameras.

10. A method as in claim 9,
wherein the one or more data packets are analyzed before the entire image frame has been received in the memory.

11. A method as in claim 9, further comprising
sending an instruction relating to operation of the multiple cameras before the multiple cameras acquire subsequent image frames,
wherein the instruction is sent after or based on the analysis of the data in the memory.

12. A method as in claim 9,
wherein the portion of an image frame comprises one or more lines or a fraction of a line of an image frame.

13. A method as in claim 9,
wherein the first instructions comprise information related to locations of the memory configured to store the data packets,
wherein the data packets are sent by the processing module to the memory at the memory locations by direct memory access.

14. A method comprising
receiving a first instruction from a second module, by a first module comprising multiple cameras, regarding operating parameters for the multiple cameras;
sending multiple parallel streams to the second module by the first module,
 wherein the multiple parallel streams comprise image data for image frames captured by the multiple cameras,
 wherein each parallel data stream comprises a sequence of image data for one or more image frames captured by a camera of the multiple cameras,
 wherein the second module is configured to reorganize the data from the multiple parallel data streams to construct a serial data packet stream to sent to a memory of a computational system,
 wherein each data packet comprises a portion of an image frame;
receiving a second instruction from the second module regarding updating operating parameters for the multiple cameras,
 wherein the second instruction is provided by the computational system after analyzing one or more data packets sent by the first module; and
sending updated image parameters to the multiple cameras,
 wherein the updated image parameters are based on the second instruction to the multiple cameras, with the second instruction received from the computational system after the stored data packets are analyzed.

15. A method as in claim 14,
wherein the second instruction is received before the multiple cameras acquire next image frames.

16. A method as in claim 9,
wherein the computational system is configured to start performing the analysis on the data packets stored in the memory before subsequent image frames are acquired or transmitted.

17. A method comprising
continuously receiving, in parallel, multiple data streams from multiple cameras,
 wherein each data stream of the multiple parallel data streams comprises a sequence of image data for one or more image frames captured by a camera of the multiple cameras;
forming a stream of data packets,
 wherein each data packet comprises a portion of an image frame of the one or more image frames,
 wherein each data packet is associated with information relating to a location of a memory of a computational system,
 wherein the stream of data packets comprises data packets from the multiple parallel data streams arranged in a cyclic scheduling in which each data stream contributes a data packet to the stream of data packets;
sending the stream of data packets to the memory,
 wherein each data packet is stored in the associated memory location of the data packet,
 wherein the memory is configured for the computational system to perform an analysis on the stored data packets,
 wherein the computational system is configured to provide an instruction to the multiple cameras based on the analysis; and
changing imaging parameters of the multiple cameras before an acquisition of next image frames from the multiple cameras based on the instruction to the multiple cameras, with the instruction received by the computational system after analyzing the data packets stored in the memory.

18. A method as in claim 17, further comprising
receiving a command from the computational system, wherein the command comprises the information relating to the entire locations of the memory to store the data packets.

19. A method as in claim 17, further comprising
clocking the multiple cameras with a common clock to reduce timing variations of the partial image frames between the multiple parallel data streams.

20. A method as in claim 17,
wherein the computational system is configured to start performing the analysis on the data packets stored in the memory before subsequent image frames are acquired or transmitted.

* * * * *